June 28, 1960
E. M. BOWEN
2,942,527
MACHINE TOOL
Filed Sept. 19, 1955
22 Sheets-Sheet 7
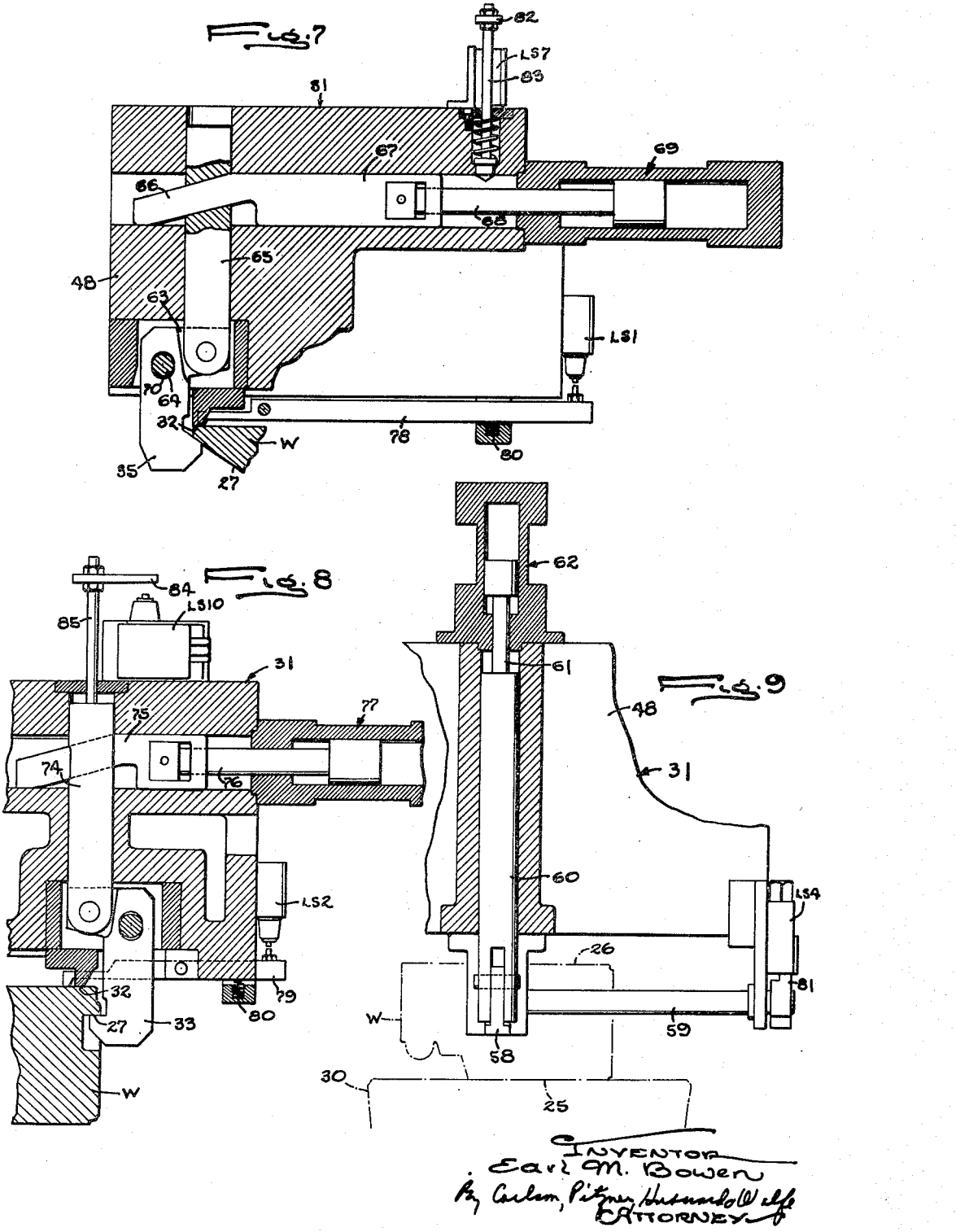

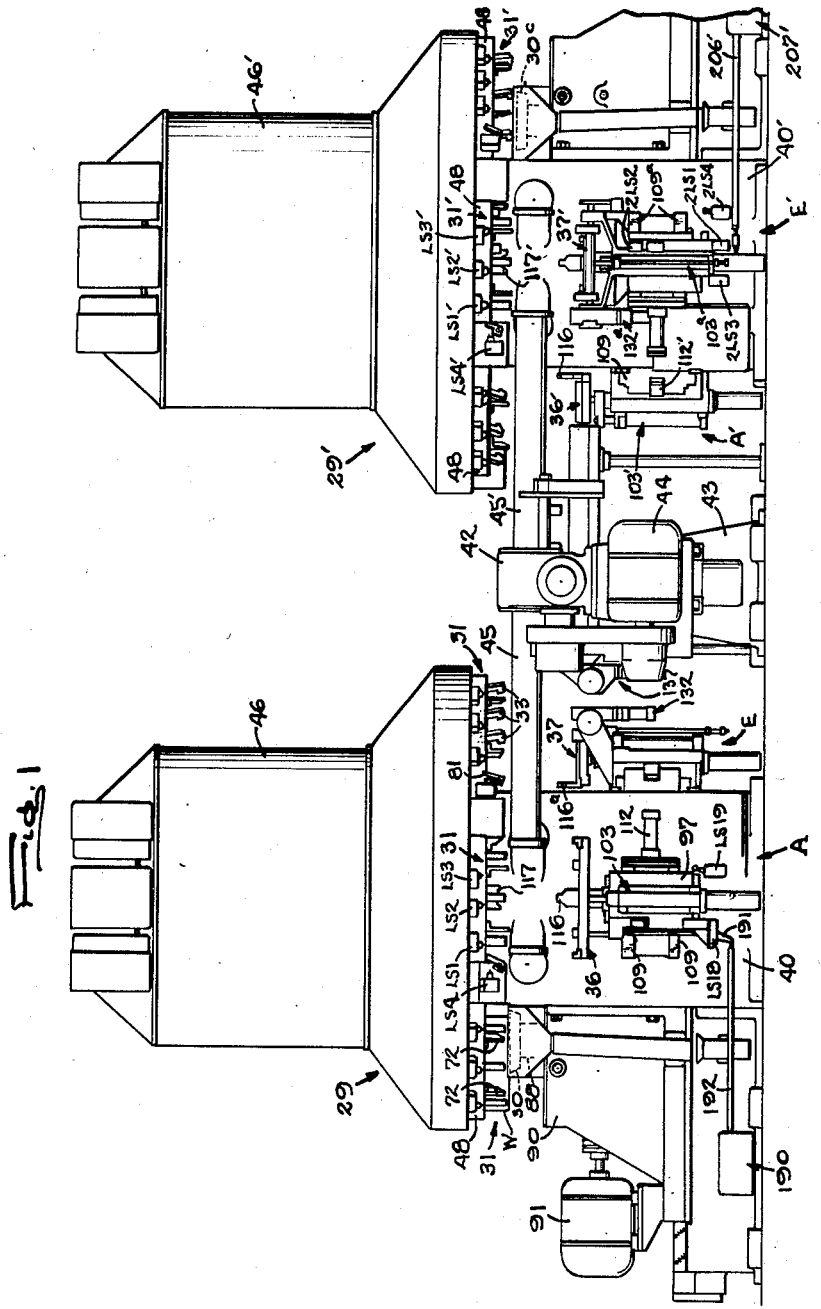

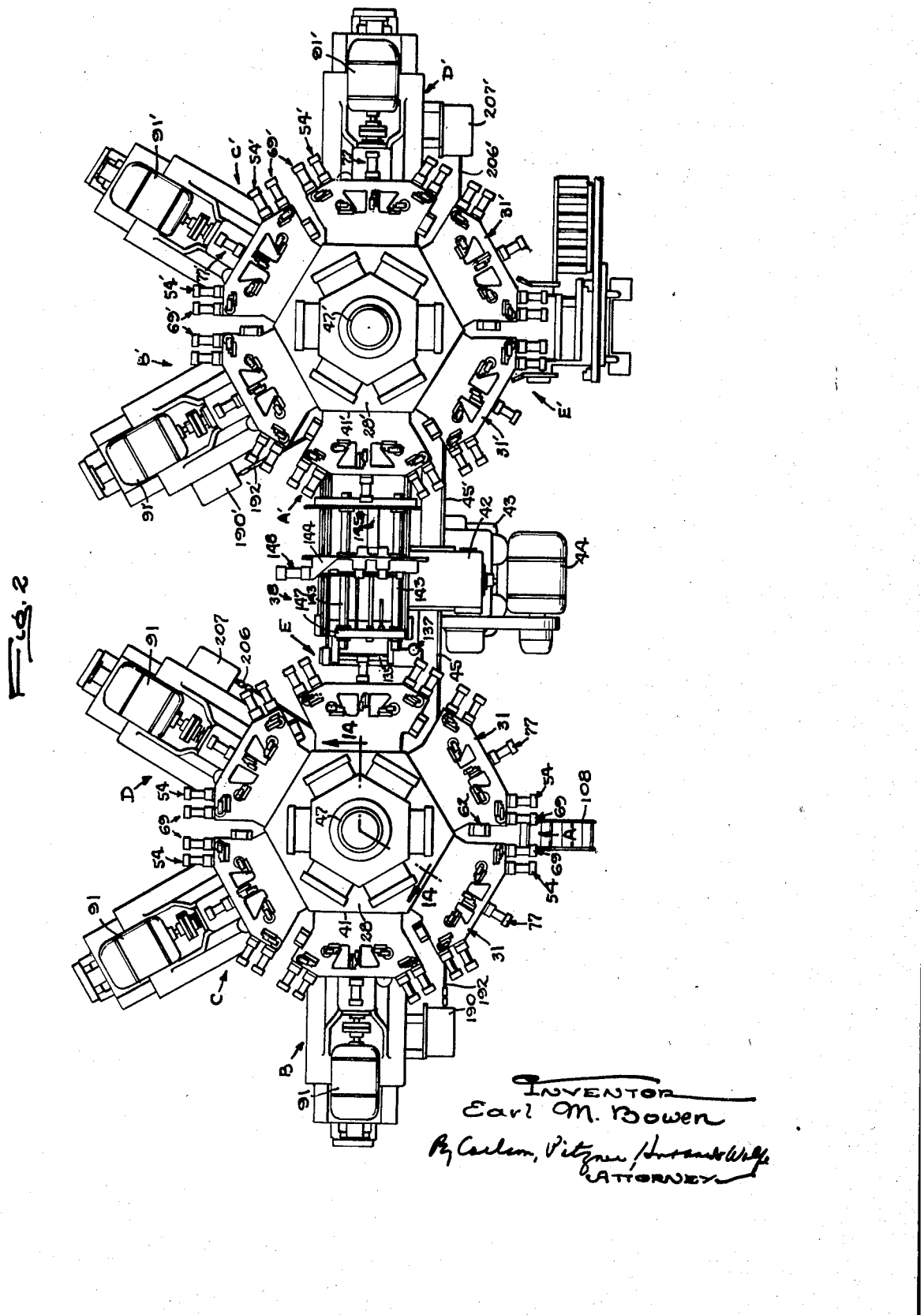

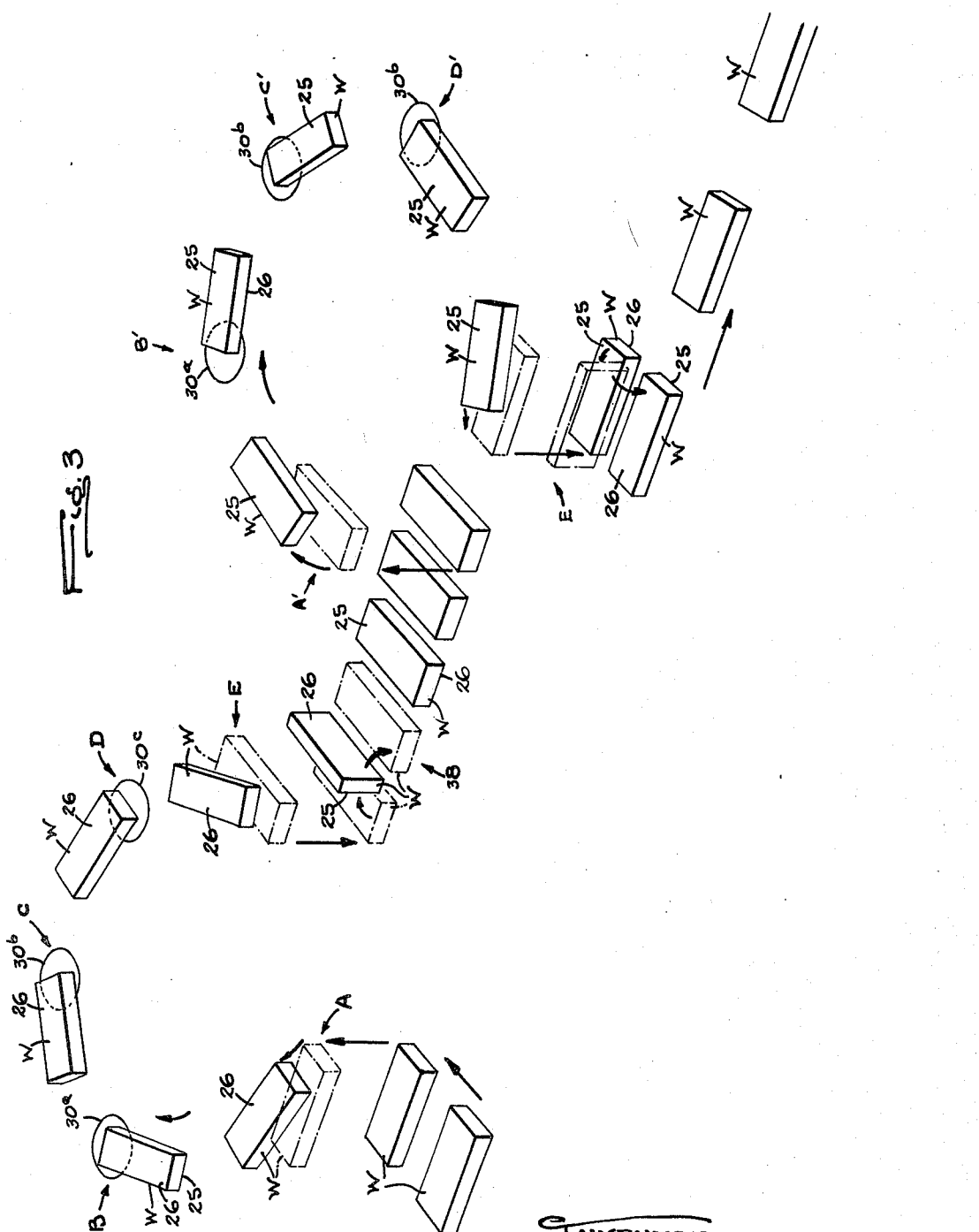

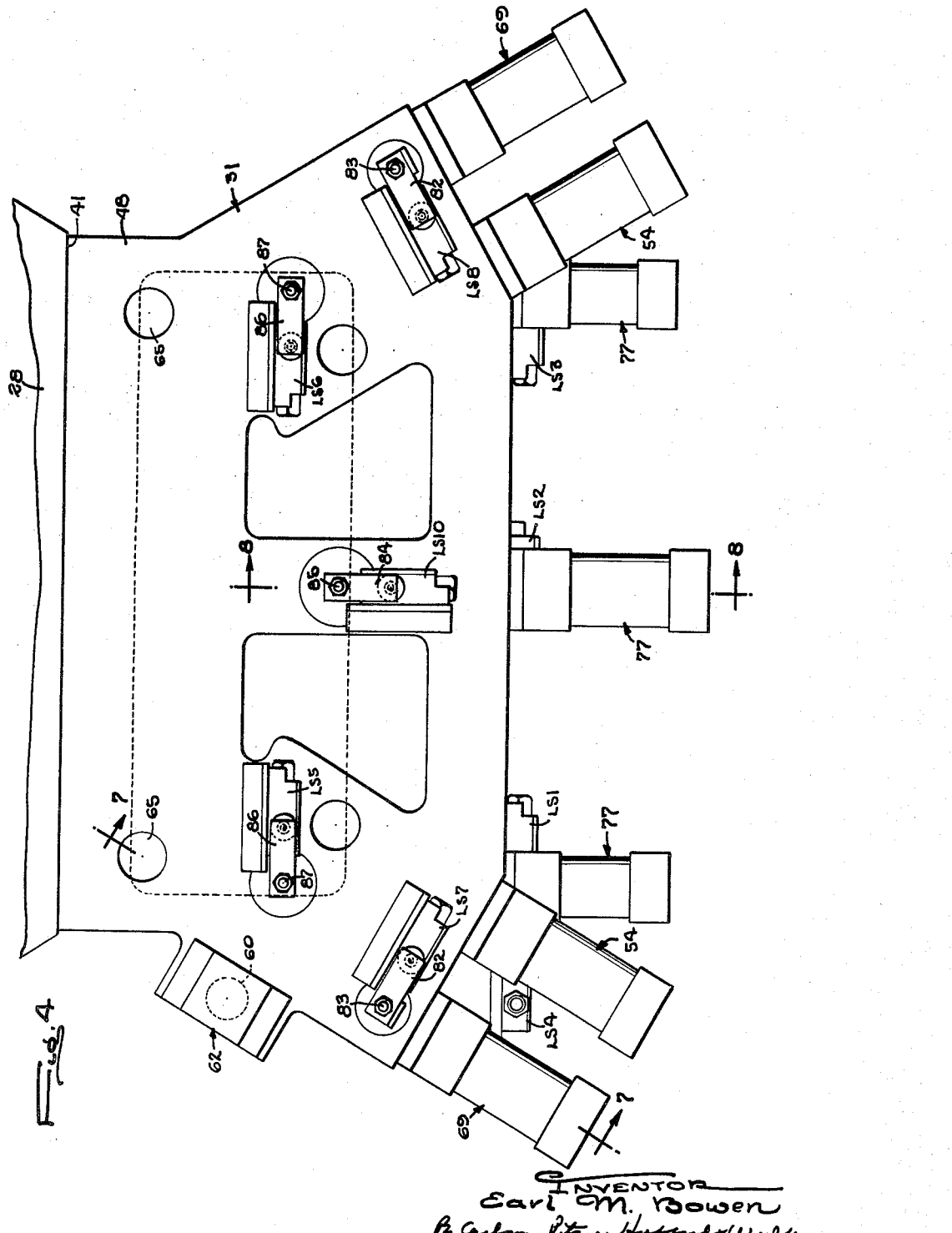

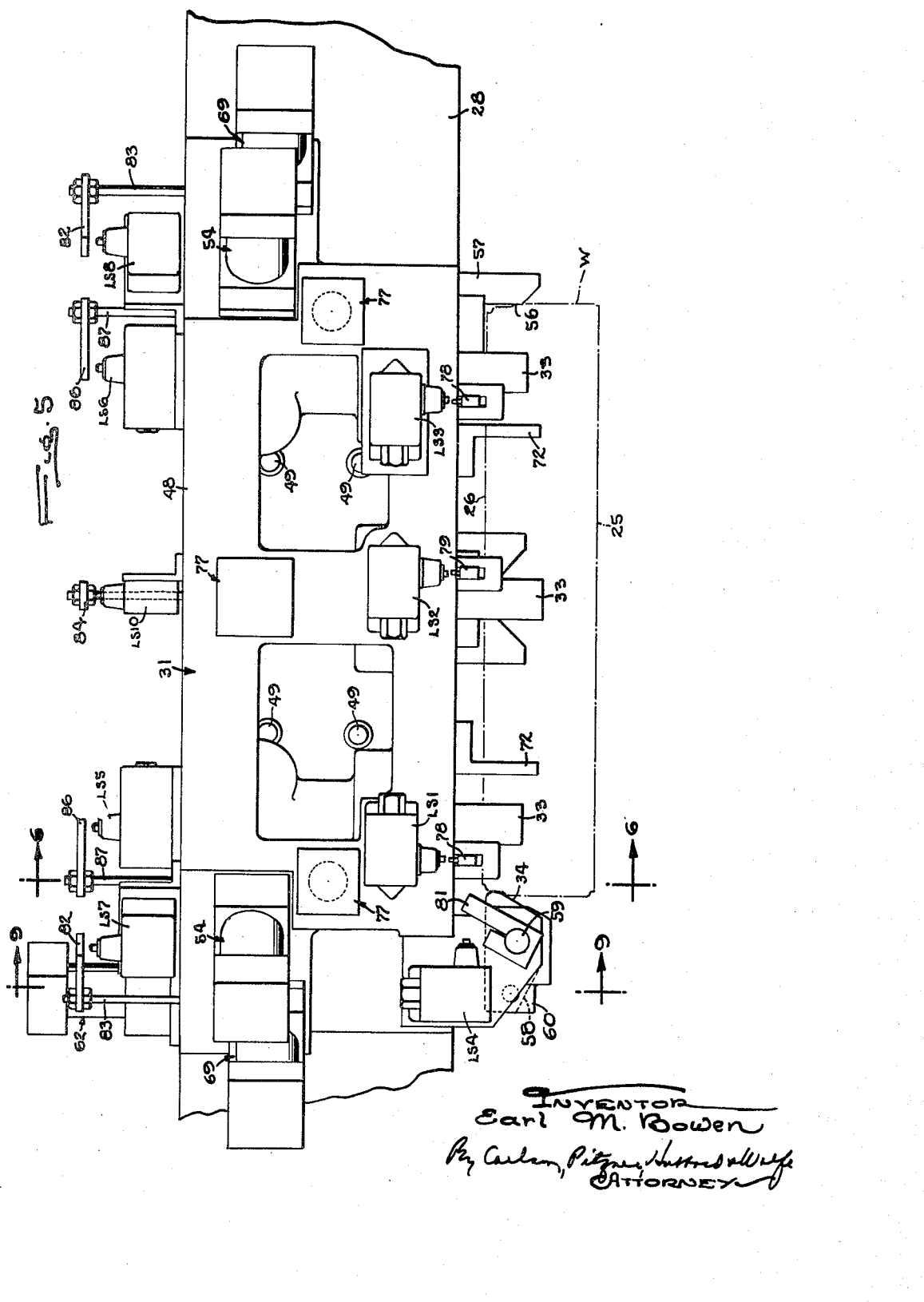

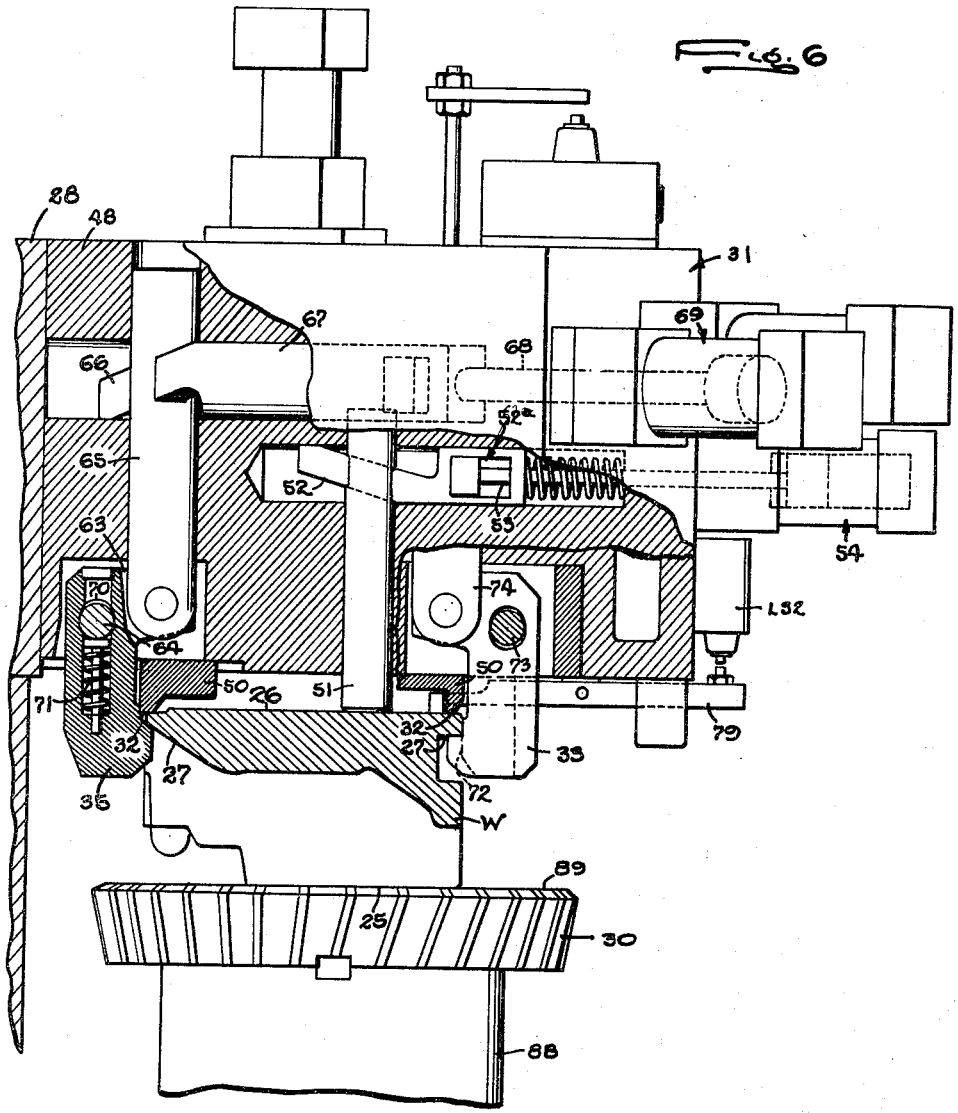

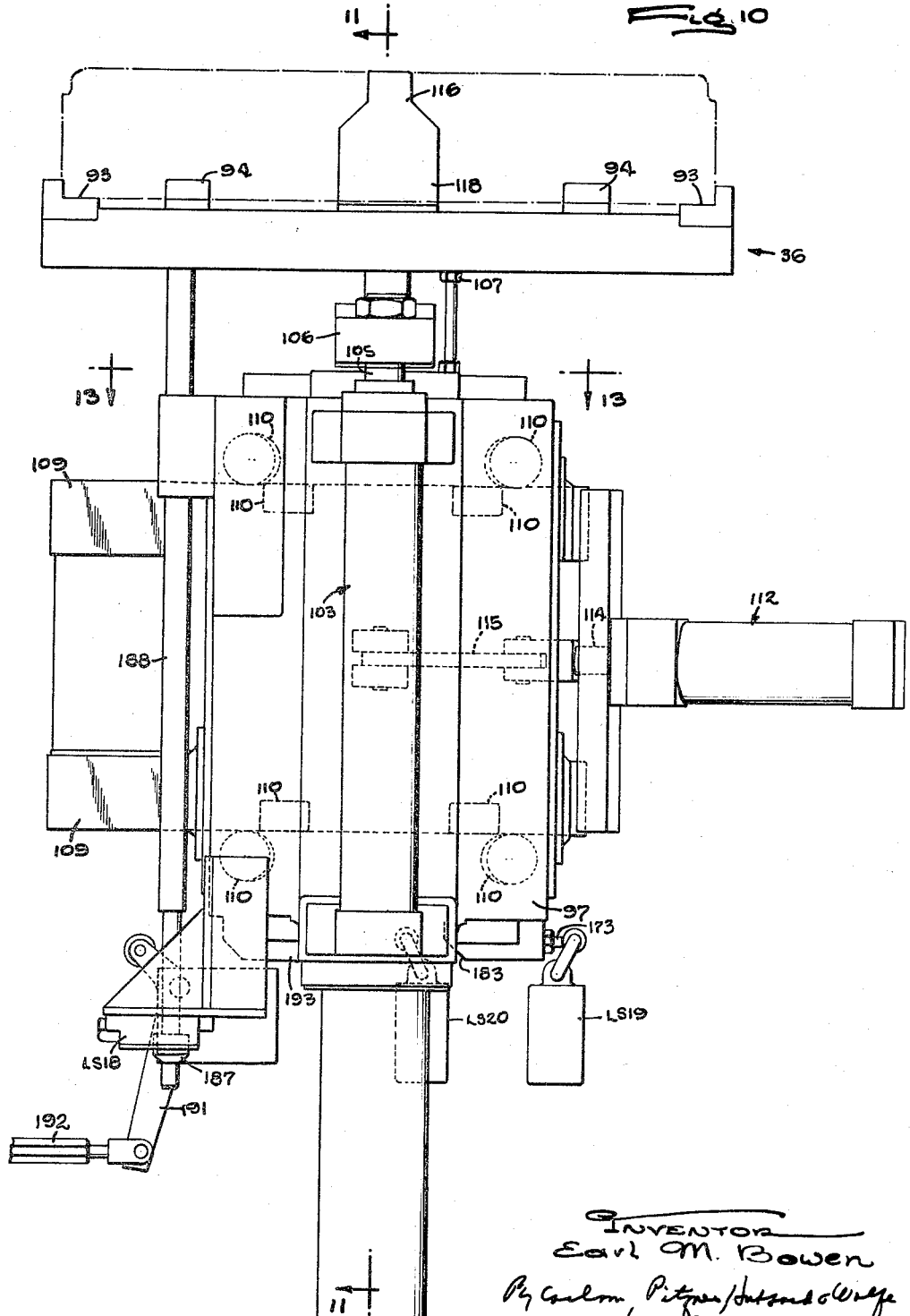

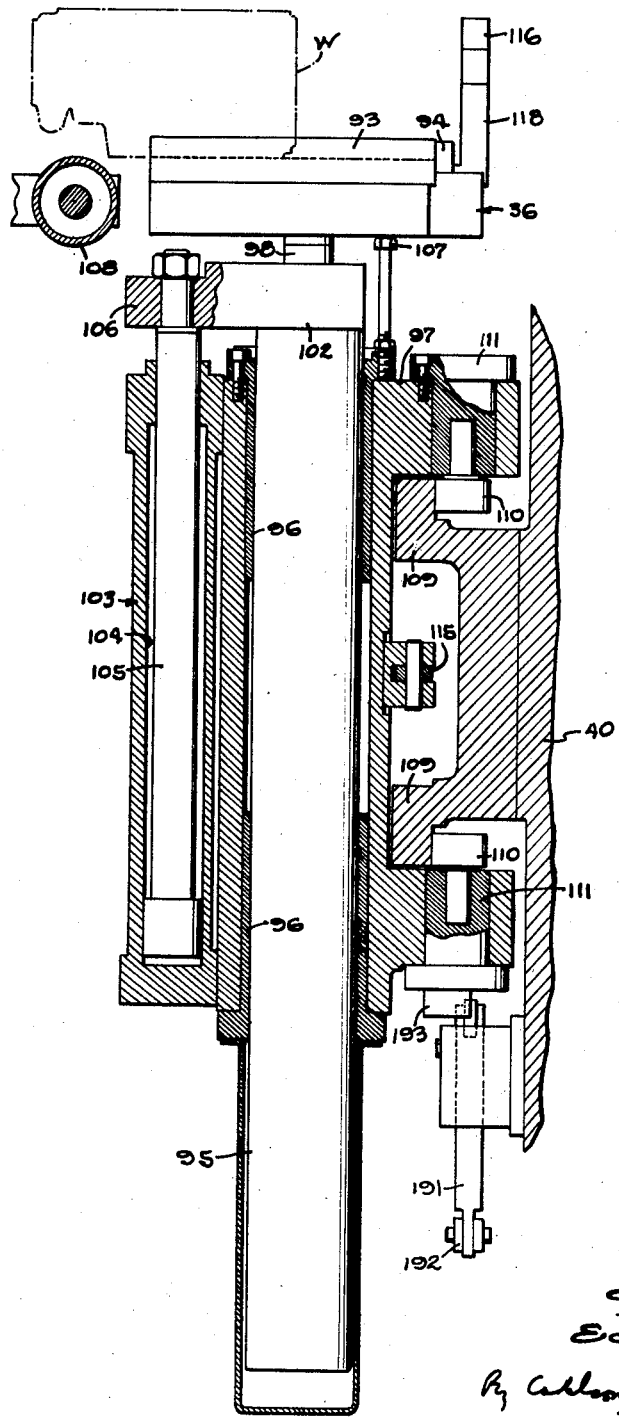

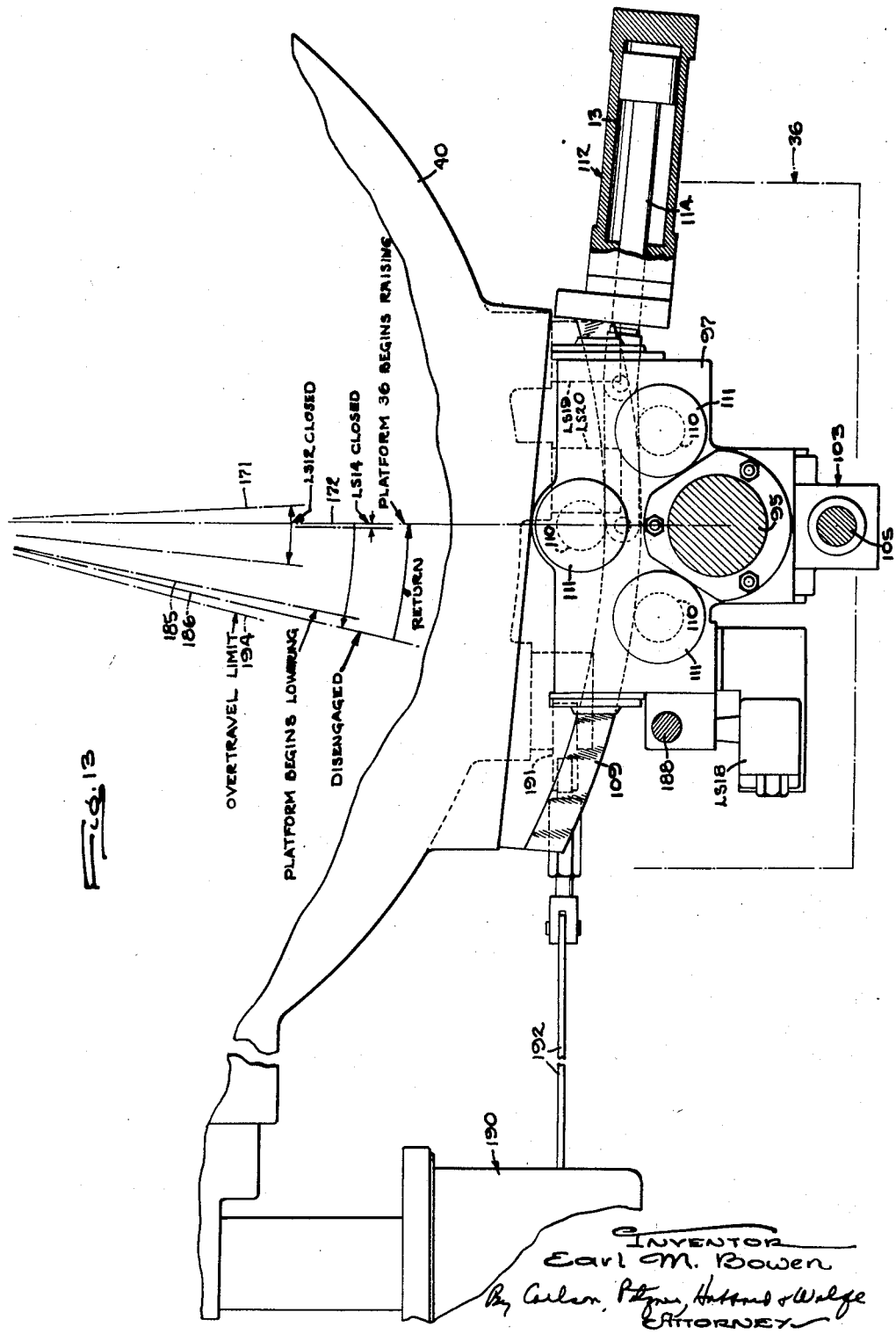

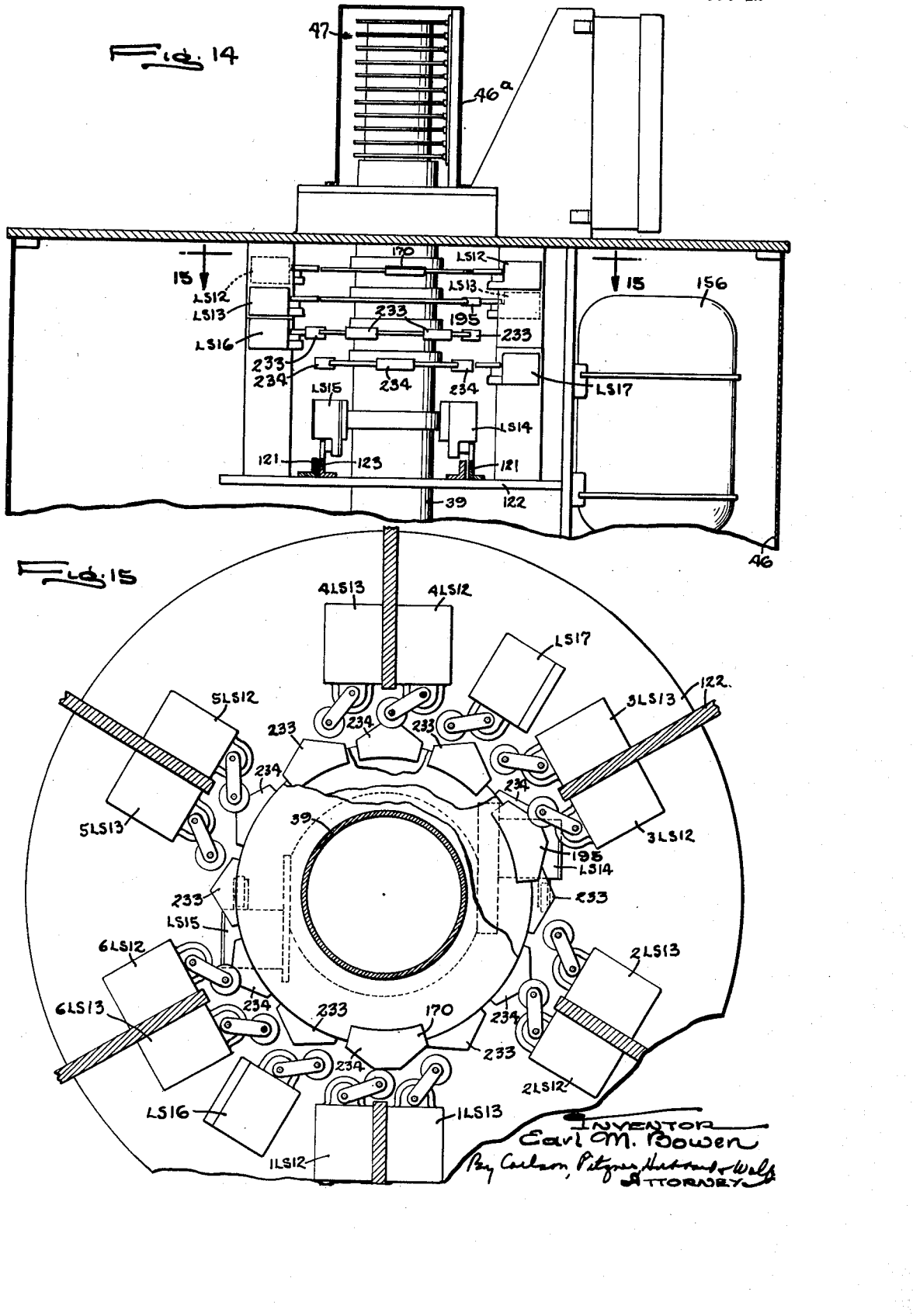

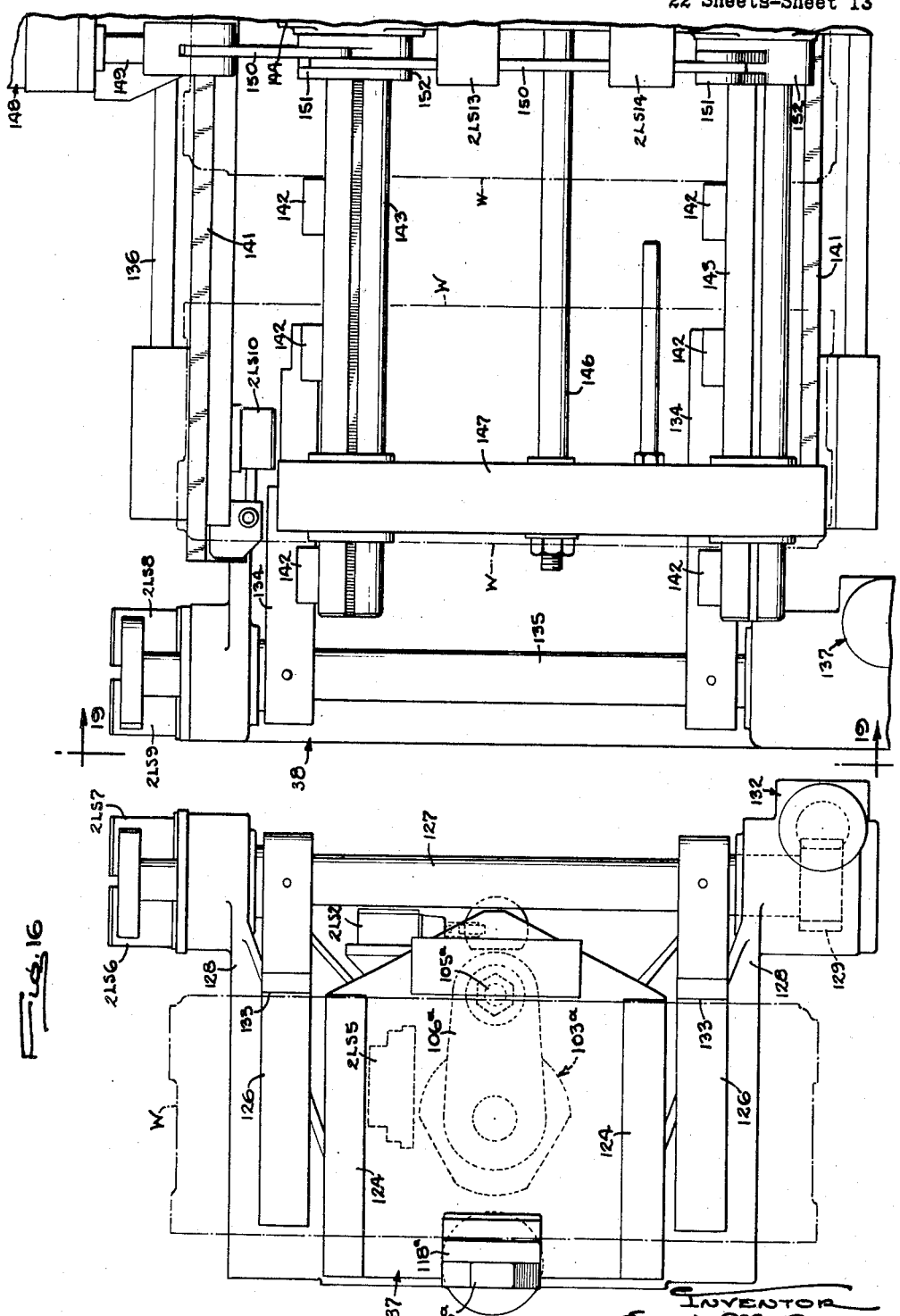

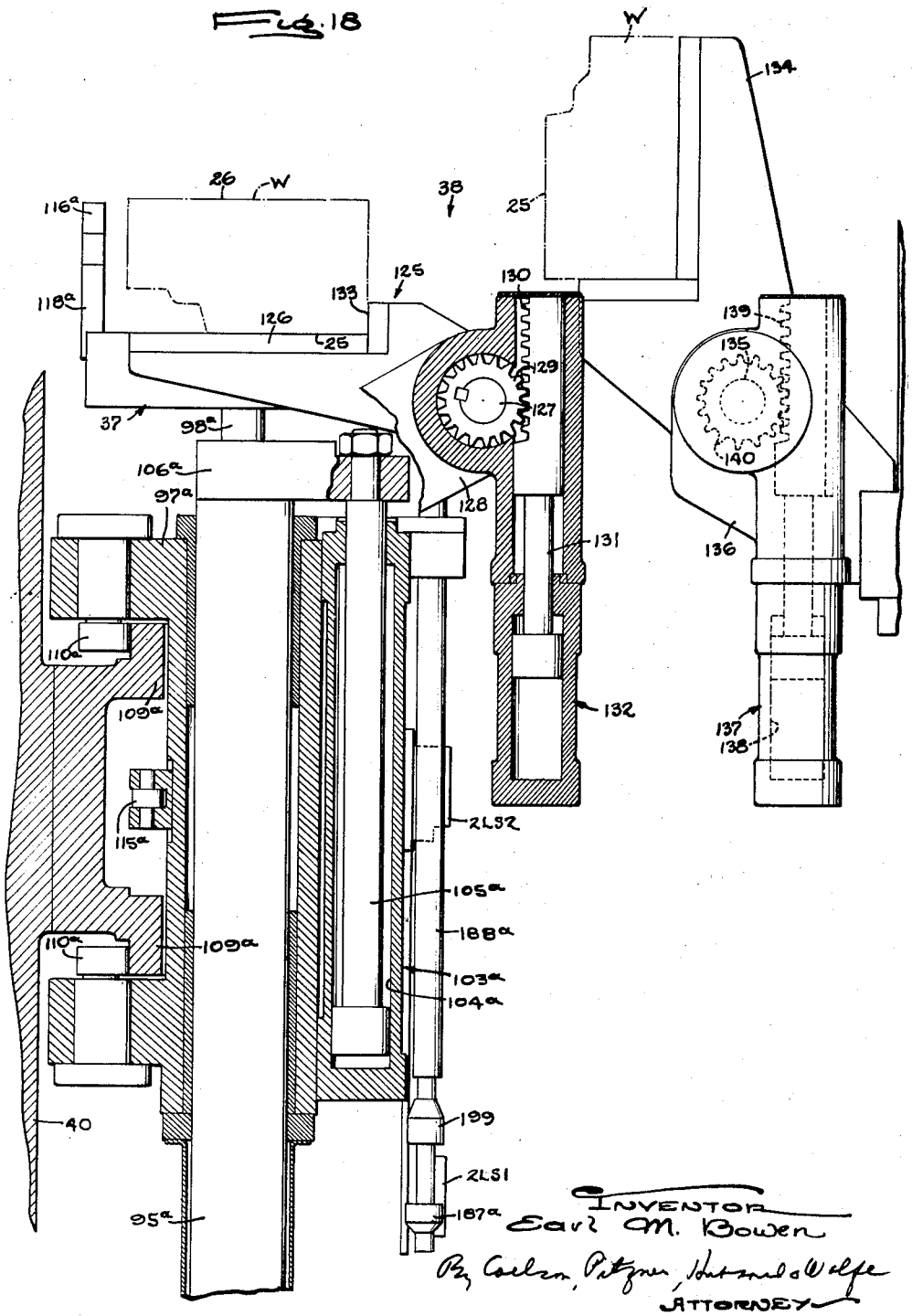

June 28, 1960  E. M. BOWEN  2,942,527
MACHINE TOOL
Filed Sept. 19, 1955  22 Sheets-Sheet 16
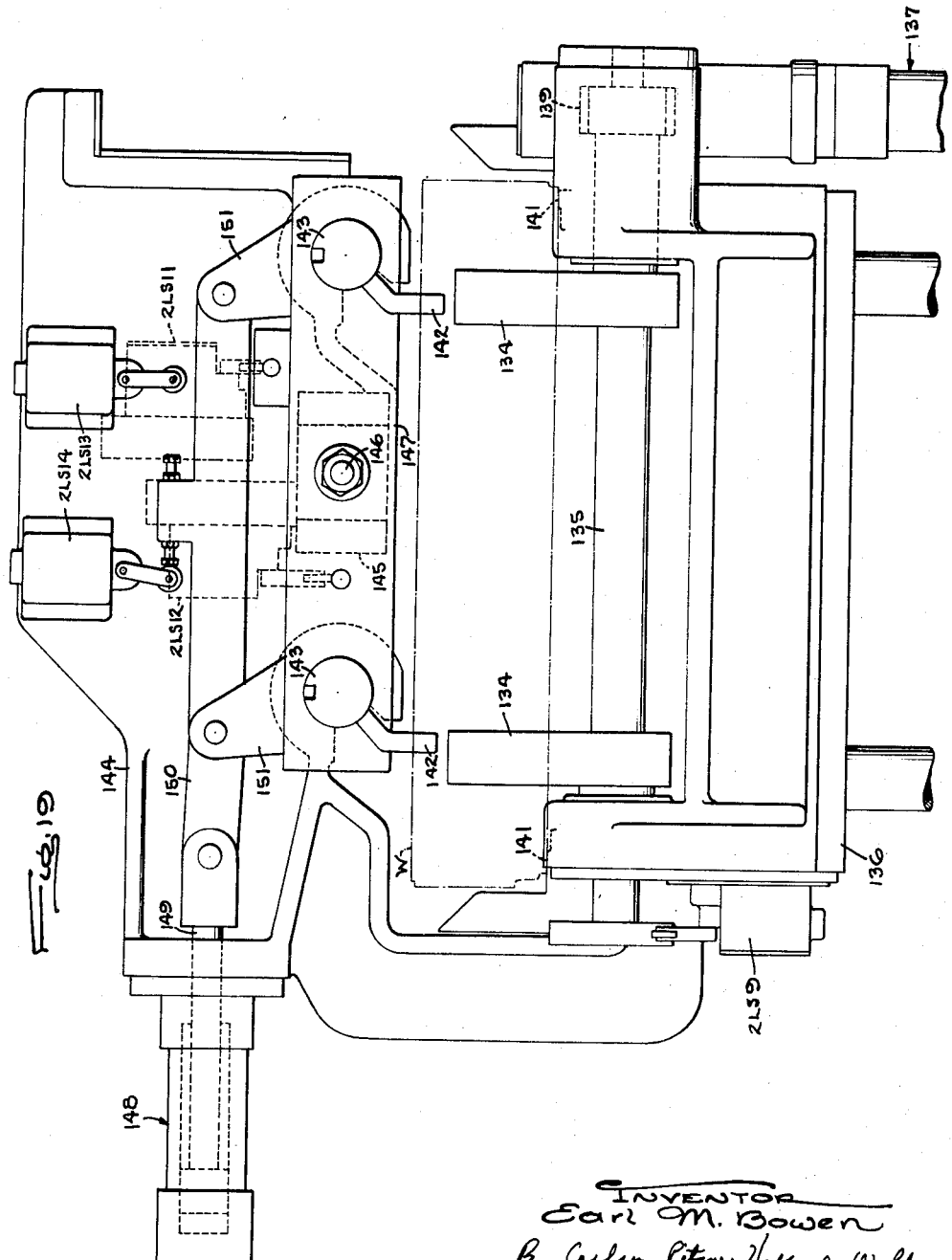

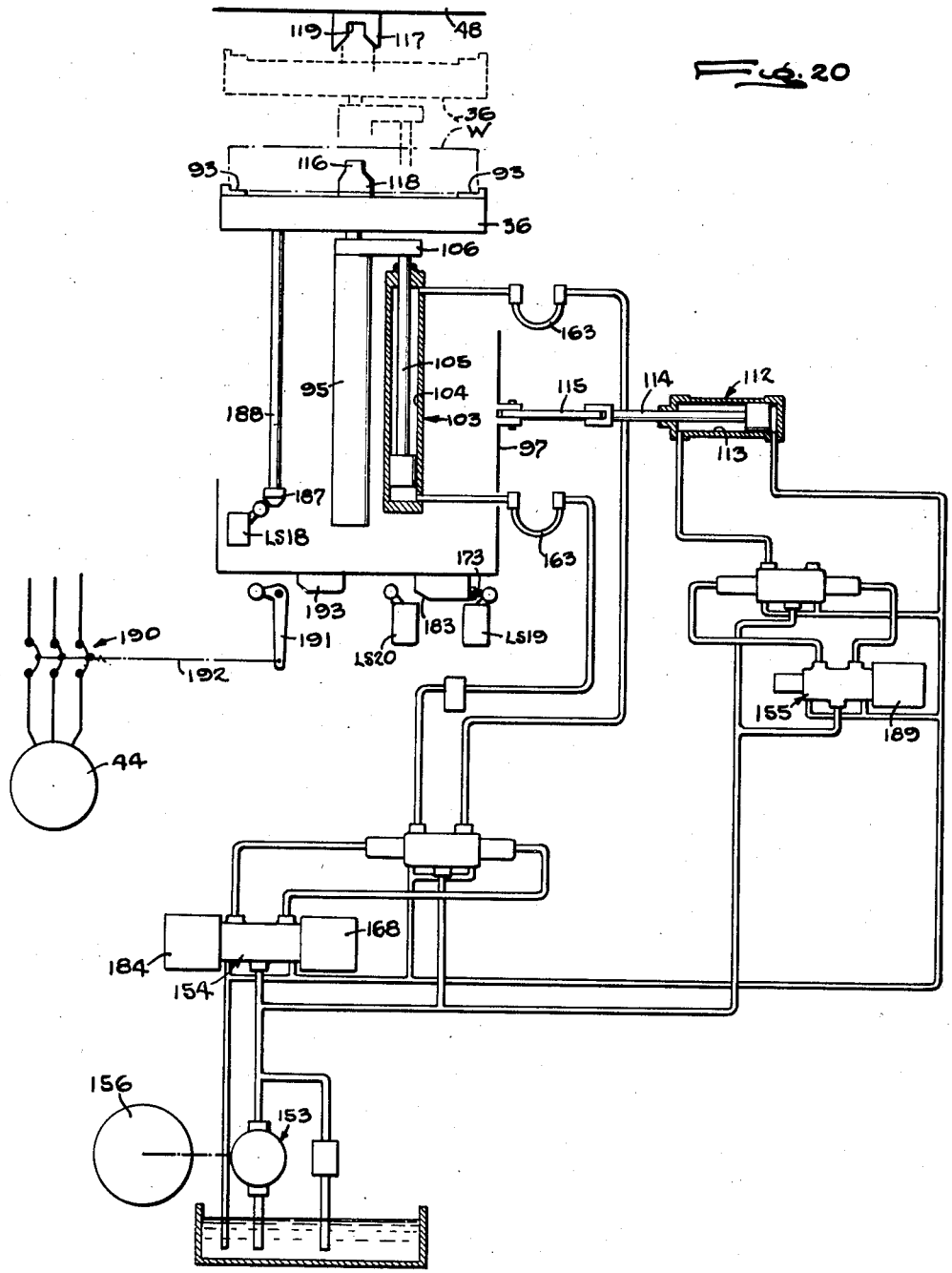

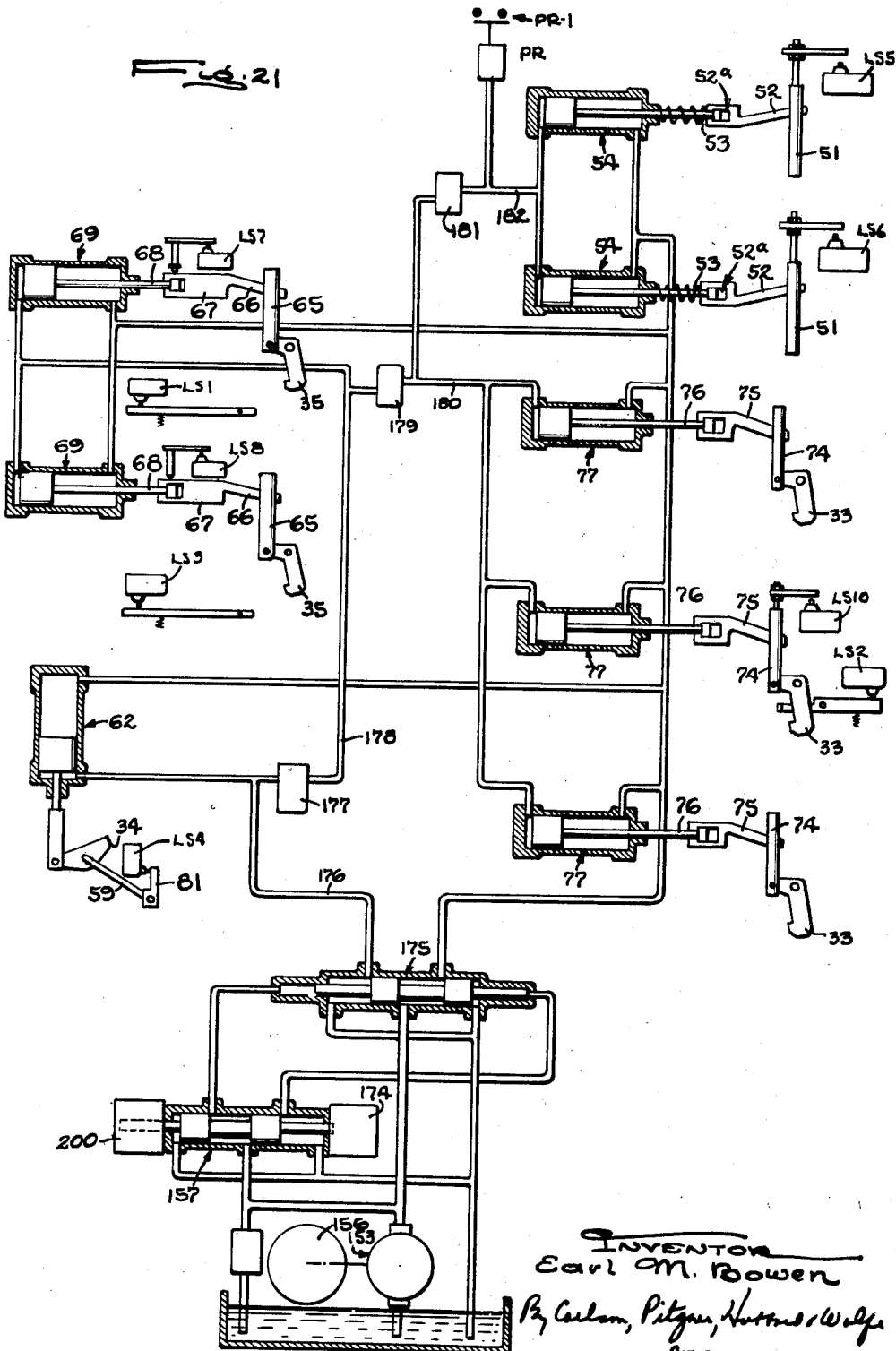

June 28, 1960
E. M. BOWEN
2,942,527
MACHINE TOOL
Filed Sept. 19, 1955
22 Sheets-Sheet 19
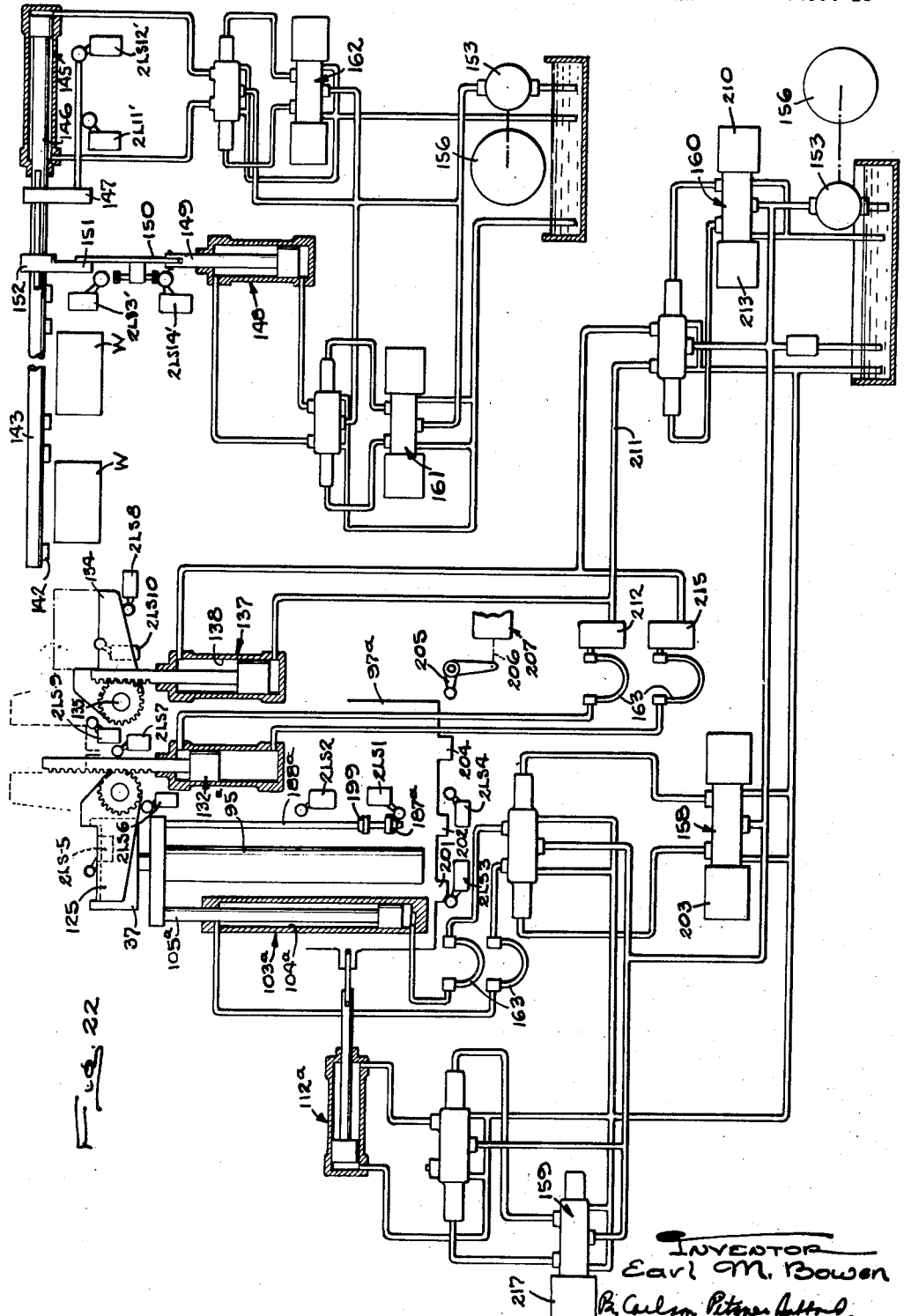

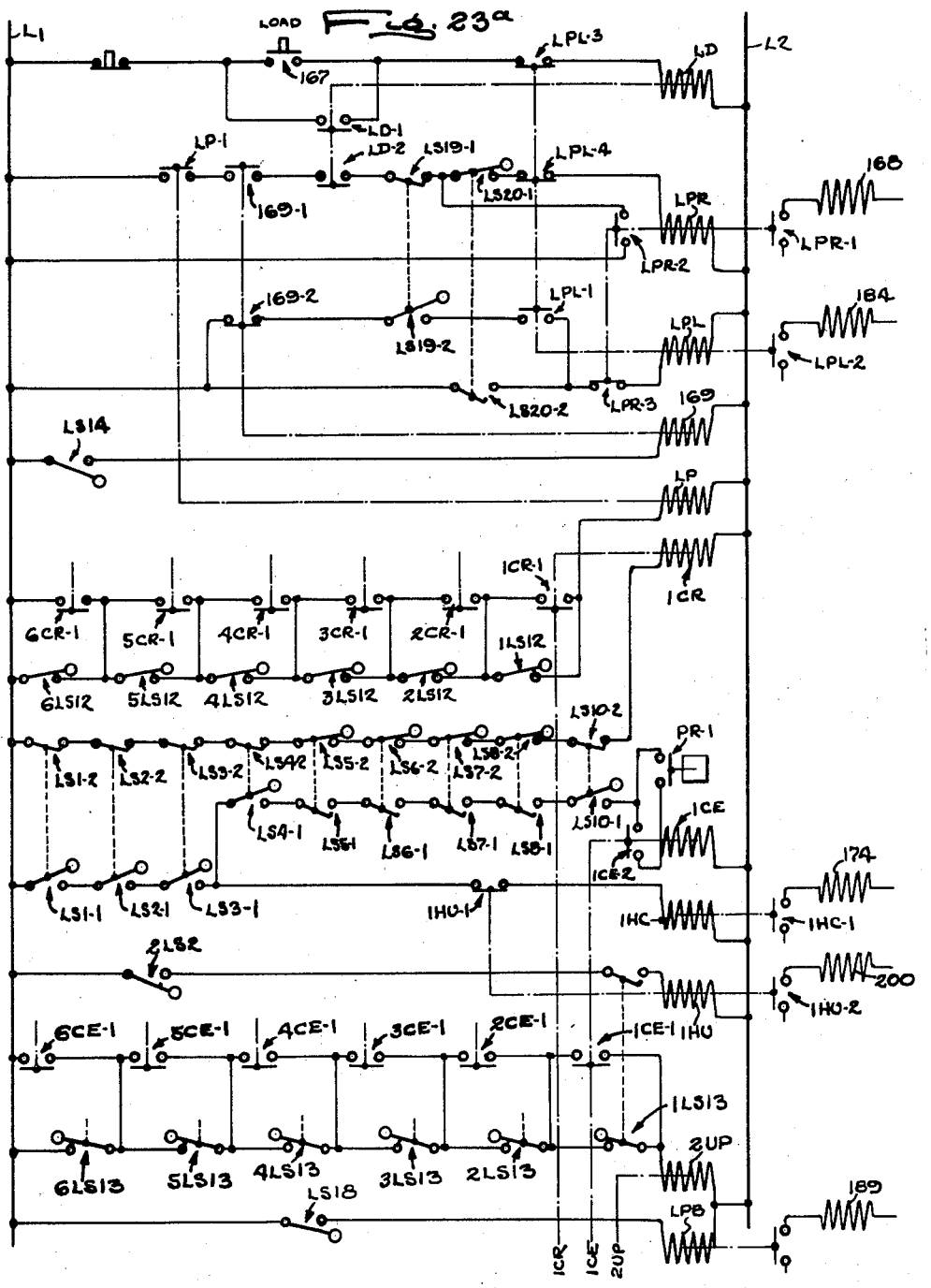

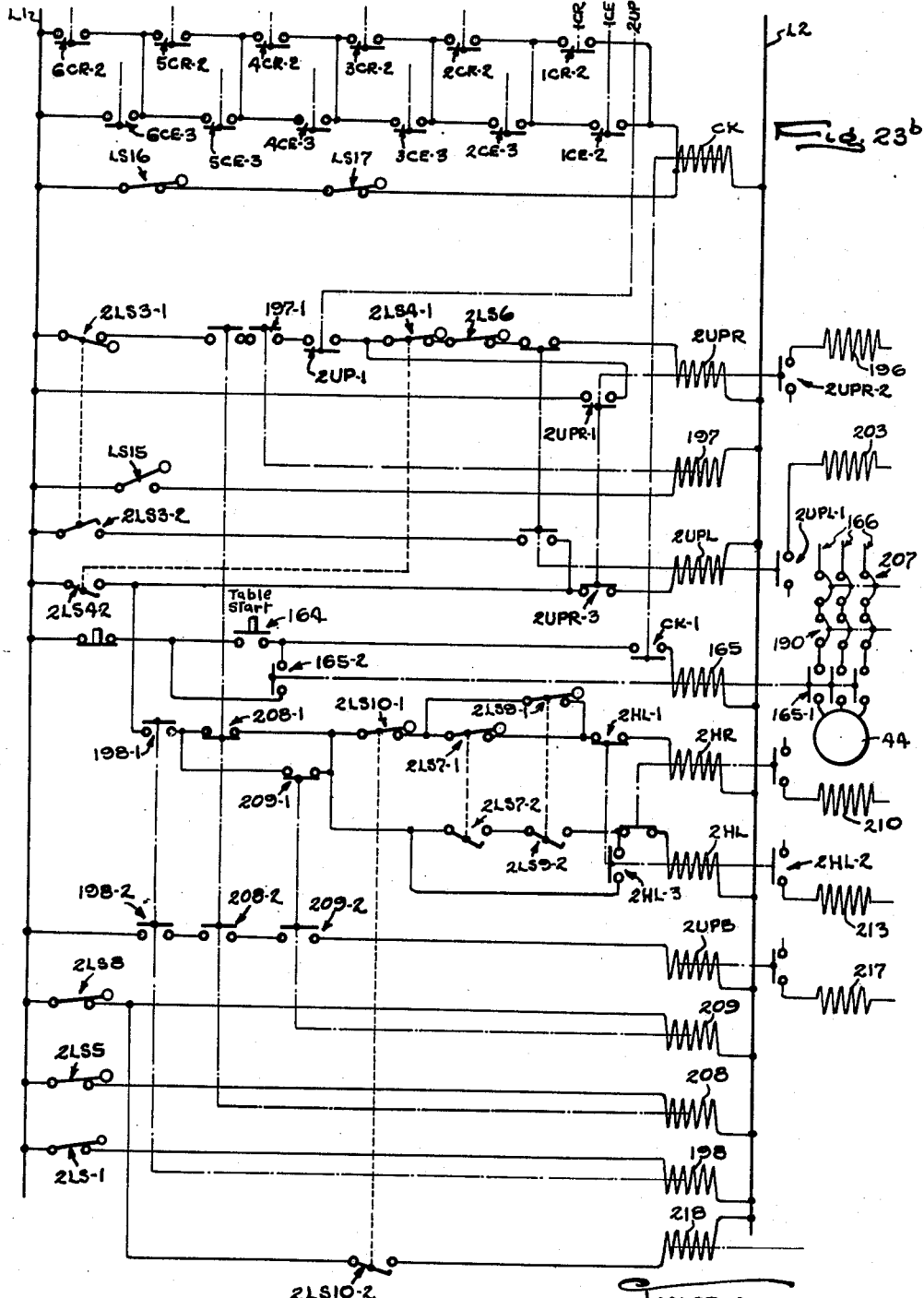

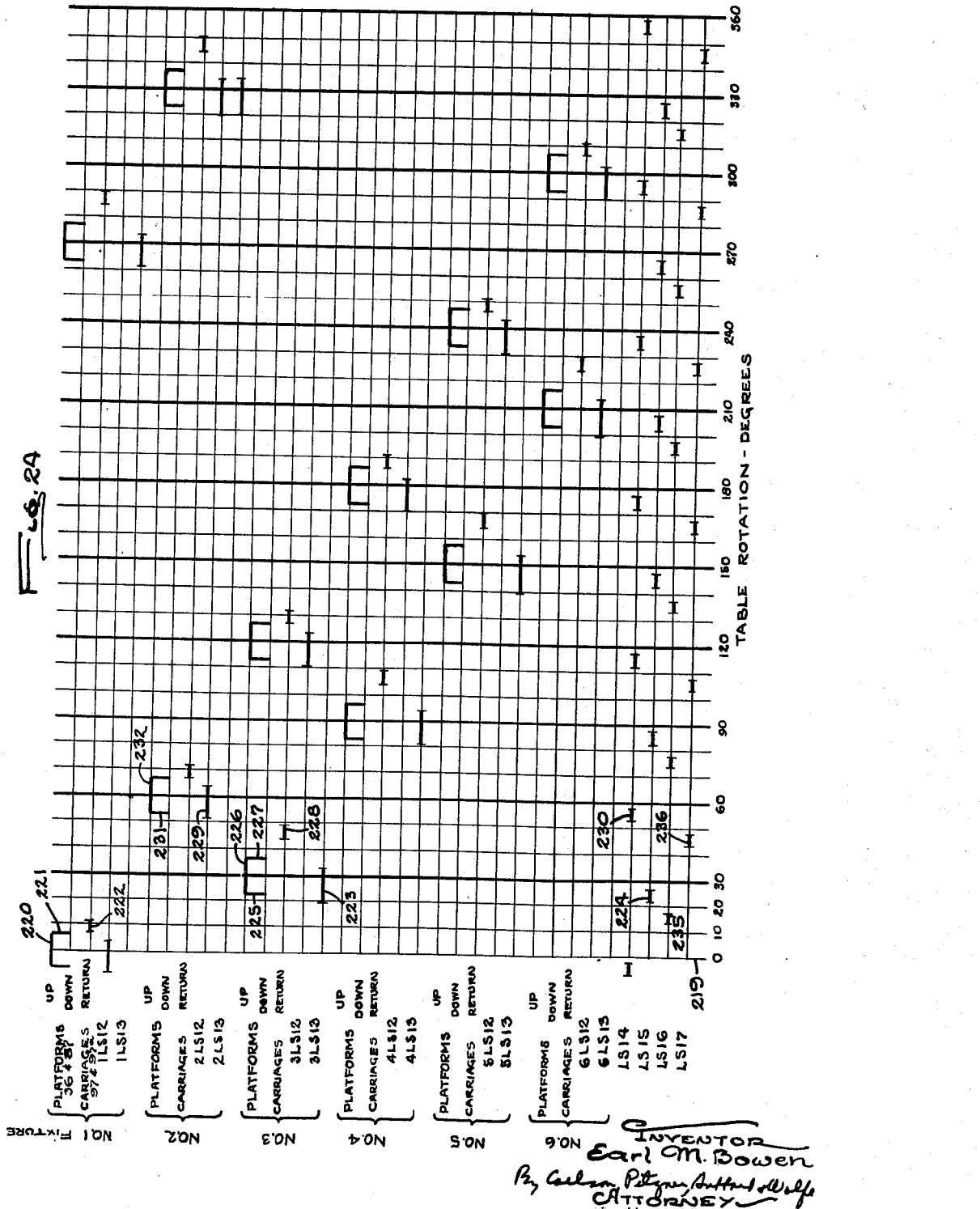

United States Patent Office 2,942,527
Patented June 28, 1960

2,942,527
MACHINE TOOL

Earl M. Bowen, Rockford, Ill., assignor to The Ingersoll Milling Machine Company, Rockford, Ill., a corporation of Illinois Filed Sept. 19, 1955, Ser. No. 535,083

28 Claims. (Cl. 90—20)

This invention relates to machine tools for removing metal from a succession of duplicate workpieces and having mechanism for automatically loading the workpieces onto and removing the finished pieces off from fixtures in which the pieces are held while being machined. The invention has more particular reference to machine tools of the type in which each workpiece is clamped in a fixture on a table which moves continuously to carry the piece past a tool for performing the machining operation.

One object of the invention is to provide a machine tool of the above character in which the workpiece, while being machined, is clamped to the traveling work support with the surface to be machined facing downwardly or otherwise positioned for the automatic disposal of chips by the action of gravity.

The second object is to load the workpieces onto the traveling work support automatically and without interrupting the motion of the latter.

A third object is to similarly unload the machined workpieces.

A fourth object is to provide for automatic and accurate positioning of each workpiece relative to the traveling support as well as clamping of the located piece after the latter is deposited in its fixture.

A fifth object is to transfer a stationary workpiece to the traveling work support through the use of a platform arranged in a novel manner to be coupled to and travel with the fixture during locating and clamping of the workpiece.

A sixth object is to provide a similarly but reversely operated platform for unloading the machined workpiece.

A seventh object is to carry the workpiece while being located and machined on the underside of a table continuously rotated about an upright axis.

An eighth object is to transfer the finished workpiece from the unloading platform to a turnover device which is constructed in a novel manner to receive the piece and change the position thereof to expose a different surface for machining in a second machine tool automatically as an incident to shifting the workpiece away from the traveling support and toward the second tool.

A ninth object is to check all of the fixtures simultaneously and intermittently during continuous movement of the traveling support and to stop the latter automatically in response to the detection of a malfunction at any one fixture.

A tenth object is to check each fixture individually before a workpiece is loaded therein and to actuate the loading mechanism only when the fixture is empty and properly conditioned to receive a workpiece.

An eleventh object is to provide a similar check of each fixture before an unloading operation thereon to actuate the unloading mechanism only when a workpiece is properly located and clamped in the fixture.

The invention also resides in the novel construction and operation of the loading and unloading platforms and the manner of locking each platform to the traveling work support and of actuating and releasing the locating and clamping devices.

Other objects and advantages of the invention will become apparent from the following detailed description taken in connection with the accompanying drawings, in which Figure 1 is a front elevational view of a machine tool organization embodying the novel features of the present invention.

Fig. 2 is a plan view of the organization with parts of housings removed.

Fig. 3 is a diagrammatic view showing the different positions of and operations performed on a workpiece traveling through the organization.

Fig. 4 is a plan view of one of the fixtures on the traveling work support.

Fig. 5 is a front elevational view of the fixture.

Fig. 6 is a sectional view taken along the line 6—6 of Fig. 5 and showing the relation of a workpiece clamped in the fixture to one of the metal removing tools.

Fig. 7 is a sectional view of the fixture taken along the line 7—7 of Fig. 4.

Fig. 8 is a fragmentary sectional view taken along the line 8—8 of Fig. 4.

Fig. 9 is a fragmentary sectional view taken along the line 9—9 of Fig. 5.

Fig. 10 is a front elevational view of the loading platform and its mounting.

Fig. 11 is a sectional view taken along the line 11—11 of Fig. 10, some of the parts being broken away.

Fig. 13 is a sectional view taken along the line 13—13 of Fig. 10 and indicating diagrammatically different angular positions of the fixture at which various operations are performed.

Fig. 14 is a fragmentary sectional view taken along the line 14—14 of Fig. 2.

Fig. 15 is a fragmentary sectional view taken along the line 15—15 of Fig. 14.

Fig. 16 is a fragmentary plan view of the unloading mechanism.

Fig. 18 is a fragmentary sectional view taken along the line 18—18 of Fig. 17 with some of the parts broken away.

Fig. 19 is an elevational view of a part of the turnover mechanism taken along the line 19—19 of Fig. 16.

Fig. 20 is a hydraulic circuit and electric switch diagram of the loading mechanism of one machine tool in the organization.

Fig. 21 is a hydraulic circuit and electric switch diagram of one fixture on the traveling work support.

Fig. 22 is a hydraulic circuit and electric switch diagram of the unloading and turnover mechanism.

Figure 12:
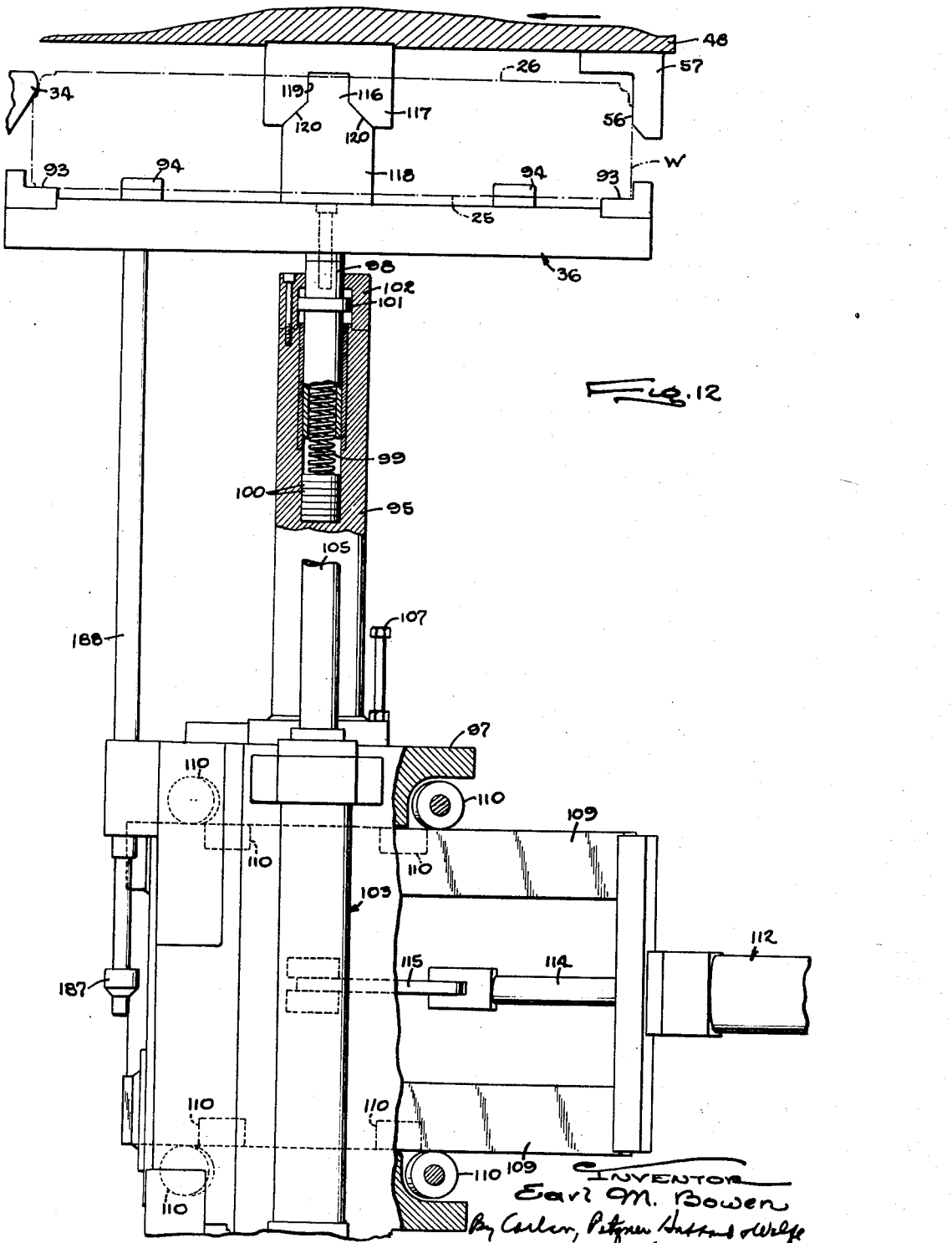
Fig. 12 is a view similar to Fig. 10 with the parts in different positions and with some of the parts broken away and shown in section.

Figs. 23a and 23b when placed one above the other form an electric circuit diagram.

Fig. 24 is a time chart showing a sequence of the various loading, unloading and checking operation performed in connection with the various fixtures during continuous movement of the traveling work support.

For purposes of illustration, the invention is shown in the drawings incorporated in a machine tool organization for performing milling operations on at least one exterior surface 25 of duplicate workpieces W and, in this instance, also on another exterior surface 26. The workpieces shown are generally oblong cylinder head castings for internal combustion engines and the work surfaces 25 and 26 are flat and face in opposite directions from opposite sides of each piece, the edges of the latter between the work surfaces being recessed as shown in Figs. 6 and 8 to provide surfaces 27 which are spaced from the work surfaces and are utilized for locating and clamping the piece while leaving one work surface exposed. It is to be understood that the invention is not limited to this kind of workpiece or the particular character of operations performed thereon, but is intended to cover all modifications and alternative constructions falling within the spirit and scope of the appended claims.

General organization

In the exemplary machine tool organization, workpieces W are loaded successively onto a traveling work support 28 at one station A (Figs. 2 and 3) of a machine tool 29 and are advanced thereby successively past rough, semi-finish, and finish milling cutters 30a, 30b, and 30c (Fig. 3) at stations B and C and D and then to a station E where the workpieces are unloaded from the support. The latter preferably is advanced continuously for high production and, in this instance, comprises a table mounted for rotation about an upright axis. To enable chips to be disposed of automatically by gravity, the workpieces are supported in fixtures 31 (Figs. 2 and 4 to 9) which open downwardly at points angularly spaced around the underside of the table 28 near the periphery thereof and which provide downwardly facing locating surfaces 32 (Fig. 6). A workpiece is held against such surfaces by horizontally movable clamps 33 (Figs. 6 and 8) after being positioned horizontally by an endwise locator 34 (Figs. 5 and 21) and sidewise locator-clamps 35 (Figs. 6, 7 and 21). When the workpiece is clamped in the fixture, the under surface 25 thereof is exposed for movement into engagement with the cutters as shown in Fig. 6.

Transfer of each workpiece W into a fixture 31 is effected "on the fly," that is, while the fixture is passing through the loading station A, by a transfer device 36 which is mounted for movement toward and away from the path of the fixture in a direction transverse to the path and also for limited movement along such path. To support the workpiece approximately in its final clamped position during locating and clamping of the same in the fixture, the transfer device 36 is shifted in synchronism with the fixture and moves circumferentially in unison with the latter during the locating and clamping operations. In the present instance, the transfer device 36 is a horizontally disposed platform which is shifted vertically toward and away from the fixture path and supports the workpiece with upper surface 26 of the piece exposed for movement into abutment with the downwardly facing locating surface 32 of the fixture 31. A similar but reversely operated platform 37 receives the workpiece from the fixture 31 at the unloading station E and shifts the piece into mechanism 38 (Figs. 2 and 16) by which the position of the piece is changed to expose the second work surface 26 and the piece is transferred onto a loading platform 36' of a second machine tool 29', operating in the same manner as the first tool 29 for milling of the second surface. The construction of the second tool 29' being similar to that of the first tool 29, only the latter will be described in detail, the parts of the second tool which correspond to those of the first tool bearing similar but primed reference characters.

In the present instance, the table 28 of the first tool 29 is journaled on a stationary upright post 39 (Fig. 14) projecting upwardly from a pedestal 40 (Fig. 1) for rotation about a vertical axis. The table is of regular hexagonal shape with vertically disposed flat sides 41 (Figs. 2 and 4) facing radially and outwardly for attachment of the fixtures thereto. Continuous rotation of the table is effected by an electric motor 44 (Figs. 1 and 2) mounted on a stationary base 43 and coupled to the table through a drive connection including a speed reducer 42 and a horizontal shaft enclosed by a housing 45. A similar shaft enclosed by a housing 45' connects the speed reducer to the second table 28' for rotation of the latter by the same motor in synchronism with the first table, both tables rotating in a clockwise direction as viewed in Fig. 2. All of the various hydraulic and electrical circuit elements for the fixtures are mounted within housings 46, secured to and rotating with the table. One housing 46a encloses suitable slip ring assemblies 47 (Fig. 14) for conducting electric current between the rotating and stationary posts.

Fixtures

Secured to the table and forming radial extensions which project beyond and overhang the pedestal 40 are bases 48 for the fixtures 31, there being six fixtures and therefore six bases in this instance, one secured by bolts 49 (Fig. 5) to each of the flat table sides 41 and each comprising a generally rectangular hollow casting. Each fixture is adapted to receive a workpiece disposed tangentially of the table and advanced into the fixture by bodily movement of the piece upwardly against the downwardly facing locating surfaces 32 which are defined herein by the undersides of three blocks 50 (Fig. 6) secured to the underside of the base 48 in spaced relation to define a triangle and positioned to abut longitudinal edge portions of the workpiece. Additional support for the upper side of the workpiece may be provided by two similar plungers 51 (Figs. 6 and 21) slidable vertically in the base adjacent opposite ends of the workpiece and each adapted to be projected downwardly against the upper surface 26 of the workpiece as by a wedge 52 extending through an inclined slot in the plunger and having a lost motion connection 52a (Fig. 6) with a rod 53 of a hydraulic actuator 54. The wedge is urged in one direction to advance the plunger 51 by a spring 55 and is retracted by admitting pressure fluid to the rod end of the cylinder of the actuator 54, the lost motion connection providing impact for effective locking and unlocking of the wedge.

Location of each workpiece endwise in each fixture 31 or circumferentially of the table 28 is effected by pushing the workpiece against a stop 56 (Fig. 5) facing horizontally for abutment with one end of the workpiece and formed on a depending leg of a radially extending bar 57 of L-shaped cross section with a horizontal leg secured to the bottom of the fixture base 48. The workpiece is pushed against the stop by the end locator 34 which is one end of a lever 58 fast on a horizontal rock shaft 59 (Figs. 5 and 9) journaled in the base for swinging of the locator generally horizontally in an arc between an advanced position of abutment with the workpiece as shown in Fig. 5 and a retracted position in which the locator is spaced from the stop 56 for passage of the workpiece vertically between the two. The other end of the lever 58 is pivotally connected to a slide 60 fast on the rod 61 of a vertically disposed hydraulic actuator 62 which is mounted on the top of the fixture base and operates to advance and retract the locator when pressure fluid is admitted to the rod and head ends respectively of the actuator cylinder.

After location of the workpiece W endwise against the stop 56, the locator-clamps 35 and the clamps 33 which are arranged in two sets along the longitudinal side edges of the piece are shifted horizontally beneath the clamping surfaces 27 on the latter and are pressed upwardly with sufficient force to clamp the piece against the downwardly facing locating surfaces 32 of the fixture. Herein, there are two locator-clamps 35 (Figs. 6 and 7) arranged on the inner side of the fixture adjacent the table 28 proper, each of these clamps comprising an upwardly facing surface on a depending arm of a bell crank which is fulcrumed on a horizontal shaft 64 and whose other horizontally disposed arm 63 is pivotally connected to the lower end of a vertically reciprocable plunger 65. The latter is guided in the fixture base and is shifted vertically by a wedge 66 extending through an inclined slot in the plunger and formed on one end of a slide 67 having a lost motion connection with the piston rod 68 of a hydraulic actuator 69. The clamping surface proper of each locator-clamp 35 is inclined upwardly to correspond to a complementally inclined one of the clamping surfaces 27 on the workpiece and the hole 70 in the crank receiving the fulcrum shaft 64 is elongated vertically for limited vertical floating of the crank on the shaft, a spring 71 (Fig. 6) acting between the shaft and the crank to urge the latter downwardly. When the locator-clamps are first advanced horizontally by raising of their plungers 65, they shift the workpiece sidewise or radially and outwardly relative to the table against suitable stops 72 (Fig. 5) depending rigidly from the fixture base 48.

The clamps 33 of the other set on the outer side of the workpiece remote from the table (see Fig. 6) are three in number and similarly comprise upwardly facing surfaces on depending arms of bell cranks floatable vertically on horizontal fulcrum shafts 73 and swingable horizontally in arcs about the latter by plungers 74 which are shifted vertically in the fixture base 48 by wedges 75 having lost motion connections with piston rods 76 of hydraulic actuators 77 on the base. The shape of the work engaging surfaces of the clamps corresponds to the clamping surfaces of the work engaged thereby, such surfaces in this instance being parallel to the surfaces 25 and 26 to be machined.

Means is provided to sense the presence or absence of a workpiece W in each fixture 31 and also to determine whether a workpiece in the fixture is properly located and clamped. This means comprises a plurality of switches arranged to be actuated in response to movement of a workpiece into the fixture and movement of the different locating and clamping elements relative to the fixture. Three of these switches LS1, LS2, and LS3 are mounted on the outer side of the fixture base 48 for engagement of their actuator pins by outer ends of levers 78 and 79 fulcrumed intermediate their ends on the underside of the base. Two of the levers 78 (Figs. 5 and 7) extend across the underside of the base for engagement by inner corners of a workpiece abutting the fixture locating surfaces 32 and the third lever 79 (Figs. 5, 6 and 8), is located near the center of the base for engagement by the center of the outer side of the workpiece. Springs 80 (Figs. 7 and 8) act between the base and the outer lever ends to urge the latter upwardly toward the actuators of the switches, the levers shifting away from the actuators as shown in Figs. 7 and 8 for closure of normally open contacts LS1–1, LS2–1, and LS3–1 (Fig. 23a) of the switches in response to raising of the inner lever ends by a workpiece.

A switch LS4 (Figs. 5, 9 and 23a) for sensing the position of the end locator 34 is mounted on the fixture base 48 for engagement of its actuator by an arm 81 projecting rigidly from the rock shaft 59 which supports the locator, the arm 81 engaging the actuator when the locator is retracted and moving out of contact therewith for closure of contacts LS4–1 of the switch (Fig. 23a) when the locator is advanced as shown in Fig. 5. To sense the position of each of the locator-clamps 35 which engage the inner corner portions of the workpiece, switches LS7 and LS8 are mounted on the top of the fixture base 48 for engagement of their actuators by arms 82 rigid with the upper ends of plungers 83 (Fig. 7) slidable vertically in the base and yieldably urged downwardly into the path of the wedges 66 associated with the locator-clamps, the wedges permitting the plungers 83 to descend for closure of contacts LS7–1 and LS8–1 when the clamps are advanced. In the case of the three outer clamps 33, only one switch LS10 is provided to detect the position of the center clamp. This switch is mounted on top of the fixture base (Figs. 4, 5 and 8) for engagement of its actuator by an arm 84 rigid with a rod 85 secured to the upper end of the plunger 74 and movable away from the actuator to close contacts LS10–1 of the switch when the clamp is advanced. The locations of the pressure plungers 51 are sensed by switches LS5 and LS6 (Figs. 6, 21, and 23a) each mounted on the top of the fixture base 48 for actuation by an arm 86 rigid with a rod 87 secured to the upper end of the plunger 51, contacts LS5–1 and LS6–1 of these switches being closed when the plungers 51 are lowered.

To provide a signal indicating that a workpiece W is in the proper position against the downwardly facing locating surfaces 32 of each fixture 31, the normally open contacts LS1–1, LS2–1, and LS3–1 of the three work position switches LS1, LS2, and LS3 are arranged in series between two supply lines $L_1$ and $L_2$ in an energizing circuit for a clamping relay 1HC individual to the fixture. In this instance, these contacts are closed to complete the energizing circuit for the relay when the workpiece is properly located against the levers 78 and 79. The same contacts of these switches are also utilized in conjunction with the other switches LS4, LS5, LS6, LS7, LS8 and LS10 to give a signal when all of the various position, locating and clamping parts are shifted to their advanced positions with a workpiece properly located and clamped in the fixture. For this purpose, the normally open contacts LS4–1, LS5–1, LS6–1, LS7–1, LS8–1, and LS10–1 are connected in series with the normally open contacts of the position switches LS1, LS2, and LS3 and normally open contacts PR–1 of a pressure switch PR to complete an energizing circuit for a closed relay 1CE when all of the locating and clamping elements are advanced. Other contacts LS1–2, LS2–2, LS3–2, LS4–2, LS5–2, LS6–2, LS7–2, LS8–2, and LS10–2 of the locator and clamping element switches are normally closed upon retraction of the associated elements and are connected in a separate circuit for an open relay 1CR to energize the latter and give a signal when all of the elements are retracted.

*Cutters*

It will be seen that the locating surfaces 32 and the various locating and clamping elements 33, 34, and 35 of each fixture define a pocket opening downwardly to receive and discharge a workpiece. Due to this arrangement the workpiece is supported with its surface 25 to be machined facing downwardly so that, not only do chips tend to gravitate away from the fixture locating surface 32 thereby leaving the latter clean, but also the cutters 30a, 30b and 30c may be mounted for easy access to facilitate removal and replacement after sharpening. Thus, each cutter is secured to the upper end of a vertical spindle 88 (Fig. 6) with the flat cutting face 89 thereof lying in a horizontal plane and facing upwardly. The spindle 88 is journaled in a support 90 (Fig. 1) which is rigid with and projects radially from the pedestal 40 at the corresponding one of the cutter stations B, C, and D and mounts an electric motor 91 for driving the cutter spindle.

*Loading and unloading platforms*

Loading and accurate clamping of a workpiece W in each fixture 31 without interrupting the continuous advance of the fixture through the loading station A is made possible by mounting the loading platform 36 (Figs. 10 to 13) for shifting both toward the fixture path to project the piece into the fixture and along the path in unison with the fixture to maintain the piece approximately in its final clamped position during actuation of the locating and clamping elements of the fixture. In this instance where the fixture opens downwardly to receive a workpiece, the platform 36 is in the form of a horizontally disposed rectangular block having parallel skid plates 93 of L-shaped cross-section extending along opposite ends of the block and radially of the table to underlie and engage opposite ends of the workpiece to support and locate the workpiece circumferentially of the table. Inward movement of a workpiece advanced along the skid plates is limited by abutments 94 (Figs. 10 and 11) projecting upwardly from the inner side of the block.

The platform 36 is supported in a horizontal position on the upper end of a vertical post 95 which is disposed below the fixture path and is reciprocable endwise in bushings 96 on a carriage 97 for movement of the platform vertically toward and away from the path. To provide a yieldable pressure against the underside of the workpiece W thereon, the platform is secured to the upper end of a plunger 98 (Fig. 12) reciprocable vertically in a hollow upper end portion of the post and yieldably urged upwardly by a spring 99 acting between the plunger and the post through spacer disks 100, a collar 101 on the plunger engaging spaced opposed internal abutments on the post and an end cap 102 bolted thereto to limit endwise movement of the plunger. Raising and lowering of the platform is effected by a power actuator 103 having a cylinder 104 rigid with the carriage and a piston whose rod 105 is secured to an arm 106 projecting radially from the end cap 102 on the post. Downward movement of the platform is limited by a stop 107 (Figs. 10 and 11) on the carriage to a position of horizontal alinement with a stationary roller conveyor 108 (Fig. 2) from which each workpiece may be advanced manually onto the platform.

Arcuate ways 109 parallelling the fixture path are secured to and spaced outwardly from the pedestal 40 beneath the path and are engaged by rollers 110 on the carriage 97 to support the latter, the post 95, and the platform 36 for bodily movement along the path. Each roller 110 is rotatably supported in a block 111 secured to the carriage 97. The latter is shifted along the ways 109 in a counter-clockwise direction as viewed in Fig. 13 by another actuator 112 whose cylinder 113 is rigid with the pedestal 40 with its piston rod 114 coupled to the carriage through a link 115 pivotally connected at opposite ends to the rod and the carriage, the stroke of the piston determining the extent of movement of the carriage along the ways.

Novel means is provided to synchronize movement of the platform 36 along the fixture path in unison with each fixture 31 and thereby insure accurate support of the workpiece W by the platform in approximately the final clamped position of the piece in the fixture during actuation of the locating and clamping elements. To simplify such synchronization and maintain the platform in precisely the same location relative to the fixture, this means comprises elements 116 and 117 which move with the platform and the fixture respectively and interfit as an incident to raising of the platform to couple the latter positively to the fixture. In this instance, the locking elements are projecting and recessed parts secured to the fixture and the platform and having abutting surfaces facing longitudinally of the fixture path, one element 116 comprising a rectangular lug (Figs. 11 and 12) projecting upwardly from a block 118 rigid with the inner side of the platform. The other element 117 is a block depending rigidly from the inner side of the fixture base 48 and having a recess 119 opening downwardly and rectangularly shaped to receive the lug 116. Inclined surfaces 120 on the underside of the recessed block 117 converge upwardly and inwardly toward the recess to guide the luge into the latter when the lug is being raised with the platform and is spaced circumferentially a short distance from precise registry with the recess, the necessity of extreme accuracy in the timing of such raising thus being avoided. The lug and recess are so positioned vertically on the platform and the base that, when the lug is fully seated in the recess, the workpiece is in abutment with the downwardly facing locating surface 32 of the fixture. To insure disengagement of the skid plates 93 from the ends of the workpiece W prior to uncoupling of the platform from the fixture, the plates extend vertically a shorter distance than the circumferentially facing abutment surfaces of the lug and the recess.

It will be seen that the locking elements 116 and 117 interfit automatically as an incident to raising of the platform in synchronism with movement of the fixture through the loading station and are released upon lowering of the platform away from the fixture path. Such synchronization preferably is effected in response to the table movement by a dog 121 mounted on a frame 122 secured to the housing 46 as shown in Fig. 14 for rotation with the table and into contact with the actuator of a switch LS14. The latter is mounted on the stationary post 39 of the pedestal 40 and is connected in circuits controlling the admission of pressure fluid to the lower end of the platform raising actuator 103 at the proper time correlated with the rates of advance of the fixture and of raising of the platform to project the lug 116 into the passing recess 119. One dog 121 is provided for each fixture, the same switch LS14 being common to and activated by all of the dogs.

Figure 17:
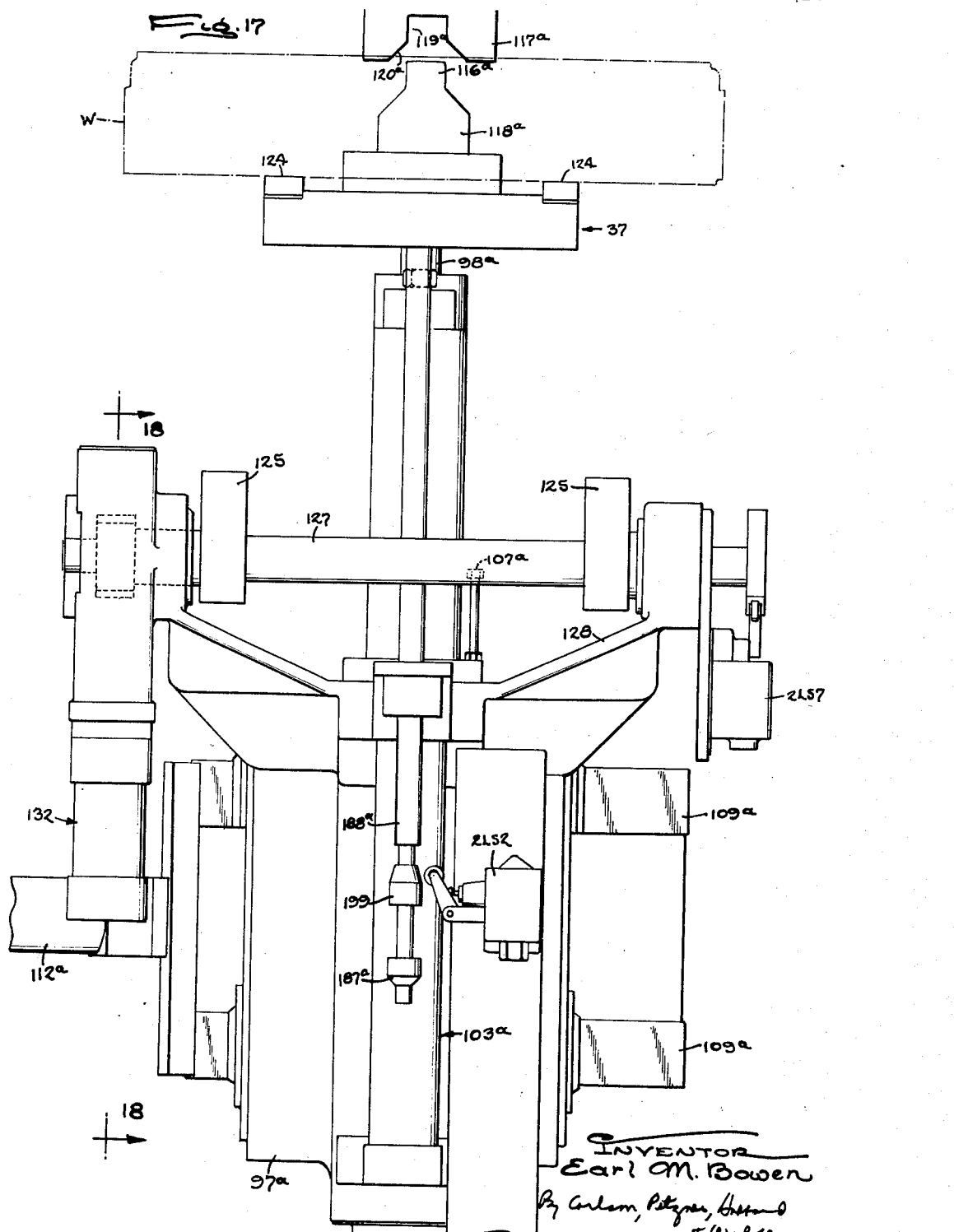
Fig. 17 is a side elevational view of the unloading platform and its mounting.

Like the loading platform 36, the unloading platform 37 (see Figs. 16, 17, and 18) is movable both vertically toward and away from the fixture path and also along the latter through a limited range in unison with each passing fixture 31, the locating and clamping elements of the fixture being actuated to release the workpiece during movement of the unloading platform with the fixture thereby leaving the piece supported on the platform. For a purpose to appear later, the unloading platform comprises a rectangular block which is shorter circumferentially than the workpiece (see Figs. 16 and 17) with flat parallel skid plates 124 secured to its upper side and underlying portions of the workpiece spaced from the ends thereof to leave the intervening portions of the piece exposed. In other respects, the construction and manner of mounting and actuating the unloading platform including the locking elements 116a and 117a are the same as for the loading platform 36, the parts at the unloading station E which correspond to those at the loading station A bearing similar reference characters each suffixed with a lower case letter a. The admission of pressure fluid to the actuator 103a to raise the unloading platform is controlled by circuits including a switch LS15 mounted on the stationary post 39 (Fig. 14) for action by dogs 123 mounted on the housing frame 122 to rotate with the table 28.

*Turnover and transfer mechanisms*

After one surface 25 of each workpiece W is finished and the locating and clamping elements 34, 35, 33 and 51 of the fixture 31 carrying the piece are retracted to release the piece for deposit on the unloading platform 37, the latter is lowered from the fixture path and the workpiece is delivered to the transfer mechanism 38 which operates to turn the piece over and shift the same horizontally for deposit on the loading platform 36' of the second machine tool 29' with its other work surface 26 facing downwardly. To reduce the number of times the workpiece is handled between the two machine tools 29 and 29' and to simplify the transfer mechanism 38, the latter includes an unloader 125 which receives each workpiece automatically as an incident to lowering of the platform away from the fixture path with the workpiece thereon and which, as an incident to turning the piece to dispose the second surface 26 thereof downwardly, automatically transfers the piece away from the platform. Such automatic transfer to the unloader is effected by constructing the platform as described above to leave a part of the underside 25 of the work exposed and by locating the unloader beneath such exposed part for engagement therewith in the lower position of the platform. To transfer the piece away from the latter and turn the piece over at the same time, the unloader moves upwardly away from the platform and through a partial revolution about a horizontal axis.

In the present instance, the unloader 125 comprises a pair of L-shaped arms which normally are disposed with longer legs 126 extending horizontally along opposite ends of the unloading platform 37 to underlie and engage the overhanging end portions of a workpiece on the platform. The arms preferably are mounted on the carriage 97a for movement with the platform along the ways 109a, the larger legs 126 projecting rigidly and radially from a horizontal shaft 127. The latter is journaled in brackets 128 rigid with the unloading carriage 97a for swinging of the arms about their horizontal axis.

To swing the unloader arms 125 about the axis of their shaft 127, a gear 129 (Fig. 18) keyed to the shaft meshes with a rack bar 130 on the rod 131 of a hydraulic actuator 132 whose cylinder is mounted on one of the carriage brackets 128. When pressure fluid is admitted to opposite ends of the cylinder, the longer legs 126 are swung back and forth through a quarter revolution between their horizontal receiving positions straddling the unloading platform 37 as shown in Figs. 16 and 18 and vertical discharge positions shown in phantom in Fig. 22 in which short legs 133 of the arms (Fig. 18) are disposed horizontally to underlie and support the corner of the workpiece adjacent the shaft 127. During swinging of the unloader arms which takes place while the carriage 97a is in an advanced position along the ways 109a, the workpiece is lifted away from the unloading platform and is turned through a quarter revolution about the axis of the shaft.

In the discharge position of the unloader arms 125, the short legs 133 thereof are disposed horizontally in alinement with similar legs of L-shaped receiver arms 134 (Figs. 16 and 18) which project rigidly from a horizontal shaft 135 paralleling the unloader shaft 132 and journaled in a stationary support 136 located between the unloading station E of the first machine tool 29 and the loading station of A' of the second tool 29'. The receiver arms 134 are swingable about their shaft 135 in a manner similar to that of the unloader arms 125 by a hydraulic actuator 137 having a cylinder 138 mounted on the stationary support 136 and a piston whose rod carries a rack bar 139 meshing with a gear 140 keyed to the shaft (Fig. 18). When pressure fluid is admitted to opposite ends of this actuator, the receiver arms 134 are swung about their shaft 135 between receiving positions shown in Fig. 18 in which the shorter legs are horizontal and underlie the workpiece and discharge positions (Figs. 16 and 19) in which longer legs of the arms are disposed horizontally between parallel horizontal rails 141 laterally spaced apart on the stationary support 136 to straddle the receiver arms. The workpiece thus is turned through another quarter revolution and is deposited on the rails with its second work surface 26 facing downwardly.

The rails 141 extend horizontally between the discharge positions of the receiver arms 134 and the loading station A' of the second machine tool 29' to support each workpiece W during advance of the same onto the loading platform 36' of the second tool. Such advance may be effected by suitable mechanism such as a plurality of sets of transfer fingers 142 which project radially from two horizontal shafts 143 disposed above and paralleling the rails 141 and journaled in overhead brackets 144 of the stationary support 136 for endwise sliding longitudinally of the rails and for limited rotation to swing the transfer fingers back and forth between upper positions in which the fingers are spaced above and move past workpieces on the rails and lower positions below the tops of the workpieces as shown in Fig. 19 to abut the pieces for shifting the same along the rails. The shafts 143 and the transfer fingers 142 thereon are shifted back and forth longitudinally of the rails 141 by a hydraulic actuator 145 whose piston rod 146 is connected to a cross bar 147 rotatably receiving the shafts and secured against movement axially thereof. Rotation of the shafts to shift the fingers between their upper and lower positions is effected by another actuator 148 mounted on the bracket 144 and having its piston rod 149 connected by pivotal links 150 to two crank arms 151 having hubs 152 keyed to and slidably receiving the shafts for axial shifting of the latter relative to the cranks.

The extent of the motions produced by the various hydraulic actuators above described may be positively limited by engagement of the pistons with the ends of the respective cylinders or by the provision of stops coacting with the movable parts. All of the actuators are supplied with pressure fluid from one or more sources 153 through circuits (see Figs. 20, 21 and 22) which are controlled by valves 154, 155, 157, 158, 159, 160, 161, and 162. The movable member of each of the two valves 155 and 159 controlling the carriage return actuators 112 and 112a is spring urged toward one position and is shifted to its other position by energization of a solenoid. The movable members of the other valves are shifted between their two end positions by selective energization of two associated actuating solenoids. When one solenoid is energized, the movable valve member is shifted to admit pressure fluid to one end of an associated hydraulic cylinder while connecting the other cylinder end to a drain line. When the other valve solenoid is energized, the valve reverses the connection between the cylinder ends and the drain end supply lines, the movable valve member remaining in its shifted position after deenergization of the associated solenoid. To permit movement of the loading and unloading platform actuators 103 and 103a and the unloader arm actuator 132 with the carriages 97 and 97a while their fluid sources 153 remain stationary, the supply lines to the actuators from the sources include flexible sections 163, the source for the fixture actuators being movable with the table and deriving power from a motor 156 mounted on the frame 122 (Fig. 14).

To cause the movable parts at the different stations to operate in the proper sequence and thereby execute a desired automatic cycle during which successive workpieces are advanced through the successive stations and are operated on at each station, the solenoid valves are arranged to be controlled by various limit and pressure switches shown in Figs. 23a and 23b. These switches control the various solenoid energizing circuits, some of which have been omitted for purposes of simplifying the disclosure and because the manner of interconnection of the omitted parts of the circuits and those shown to insure the desired sequence is well understood in the art.

*Operation*

With the machine shut down as an empty fixture 31 is approaching the loading station A, the various power actuated parts of this fixture, the loading mechanism including the platform 36, the mechanism at the unloading station E, and the transfer mechanism 38 will be in their idle or retracted positions as shown in the circuit diagrams of Figs. 20, 21, and 22 and parts of the electrical circuits will be conditioned as shown in Figs. 23a and 23b. In the latter figures, certain relays CR and CE and switches LS12 and LS13 individual to the respective fixtures are prefixed with the numbers 1 to 6 to differentiate these parts of one fixture from those of another. After pressure fluid is available at the sources 153, the cutter motors 91 and 91' are energized, and the supply lines $L_1$ and $L_2$ and motor supply lines 166 are connected to suitable sources, continuous rotation of the tables 28 and 28' is initiated by closure of a manual start switch 164 (Fig. 23b). This completes a circuit to energize a relay 165 by which the table motor 44 is connected to supply lines 166 at contacts 165–1 and which completes a holding circuit around the start switch 164 at contacts 165–2.

*Loading*

With the tables 28 and 28' rotating continuously, operations are started on a rough workpiece W by advancing the same sidewise along and between the skid plates 93 and against the stops 94 of the loading platform 36 (Fig. 10). The operator then depresses a manual load switch 167 (Fig. 23a) to complete a circuit through a relay LD which is energized to close contacts LD–1 in a holding circuit around the load switch and contacts LD–2 in a circuit through a relay LPR. Normally open contacts LPR–1 of the latter are located in an energizing circuit for the solenoid 168 of the valve 154 to deliver pressure fluid to the head end of the platform actuator 103 and raise the platform 36 when the relay LPR is energized. To complete the circuit through this relay as an incident to and in timed relation to the table movement to project the locking lug 116 on the platform into the recess 119 of the locking element 117 on the fixture, the circuit includes normally open contacts 169–1 of a relay 169 whose energizing circuit is completed by closure of the switch LS14 by the dog 121 (Fig. 14) on the table.

Means is provided for checking each fixture 31 as it approaches the loading station A and conditioning the circuit through the raise relay LPR for completion at the dog responsive contacts 169–1 only when the fixture is empty and the locating and clamping parts on the fixture are in their retracted positions for receiving a workpiece. This means includes the various switches LS1, LS2, LS3, LS4, LS5, LS6, LS7, LS8, and LS10 which sense the positions of the locating and clamping elements and normally open contacts 1CR–1 of the relay 1CR whose energizing circuit is completed when the elements are retracted but remains open if any one element is advanced. The contacts 1CR–1 are connected in parallel with a normally closed checking switch 1LS12 which is individual to the fixture and is mounted on the frame 122 for movement with the table into engagement with and opening of the switch by a stationary dog 170 on the pedestal post 39 as shown in Fig. 15. This parallel combination of the dog actuated switch 1LS12 and the contacts 1CR–1 of the relay 1CR for each fixture is connected in series with similar combinations of such switches 2LS12, 3LS12, 4LS12, 5LS12, and 6LS12 and contacts 2CR–1, 3CR–1, 4CR–1, 5CR–1, and 6CR–1 individual to the other fixtures in an energizing circuit for a checking relay LP common to all of the fixtures. Normally open contacts LP–1 of the checking relay LP are located in the circuit for the raise relay LPR in series with the normally open contacts 169–1 of the relay 169 which is energized upon closure of the table actuated switch LS14.

The positions of the switches LS12 and LS14 for each fixture are correlated with the positions of their respective associated dogs 170 and 121 for closure of the checking switch LS12 by its dog 170 when the fixture enters the loading station A as indicated by a line 171 in Fig. 13 and before the switch LS14 is closed by its dog 121 as indicated by the line 172. The checking dog 170 is of sufficient length circumferentially to hold the checking switch open during the entire time of closure of the raise switch LS14. If the load relay LD is energized and the relay 1CR of the fixture is energized to give a signal that the fixture is empty and all locating and clamping elements thereon are retracted, the checking relay 1LP will remain energized when the checking switch LS12 is opened by its dog 170 and the circuit through the raise relay LPR will be conditioned for closure by energization of the relay 169 when the raise dog 121 closes to switch LS14. This circuit is disabled, however, if either the load relay is deenergized due to failure of the operator to close the load switch 167 or if the checking relay 1CR is deenergized in response to failure of all of the locating and clamping elements to retract.

Assuming that the fixture 31 is shown to be empty during the checking and that the raise relay LPR is energized, contacts LPR–2 of the latter close to complete a holding circuit around the conditioning contacts 169–1, LP–1, and LD–2 and the contacts LPR–1 close to energize the raise solenoid 168 as indicated along the line 172 of Fig. 13. Pressure fluid thus is admitted to the lower end of the actuator 103 and the loading platform 36 is raised to project the locking lug 116 into the recess 119 of the passing fixture 31 and thereby lock the latter and the platform together for movement in unison along the fixture path, the guide surfaces 120 on the fixture locking element 118 guiding the lug into the recess. As the carriage 97 moves with the fixture and along the ways 109 out of its retracted position, a dog 173 (Fig. 20) on the carriage moves out of contact with the actuator of a switch LS19 to open contacts LS19–1 in the conditioning circuit of the raise relay LPR and close contacts LS19–2 in a holding circuit for a lower relay LPL. As an incident to raising and locking of the platform to the passing fixture, the workpiece W is pressed against the downwardly facing fixture locating surfaces 32 and the levers 78 and 79 are shifted by the work to open the contacts LS1–1, LS2–1, and LS3–1 and close the contacts LS1–2, LS2–2, and LS3–2 of the switches LS1, LS2, and LS3. Closure of these contacts completes a circuit to the clamp relay 1HC through interlocking normally closed contacts 1HU–1 of an unclamping relay 1HU. Also, such opening of the switch contacts interrupts the circuit to the relay 1CR to deenergize this relay.

Upon energization of the clamp relay 1HC, contacts 1HC–1 thereof close to energize a clamp solenoid 174 (Figs. 21 and 23a) of the valve 157 which controls a direction valve 175 for admitting pressure fluid to the rod end of the end locator actuator 62 through a line 176. The end locator 34 thus is advanced as an incident to positioning of the work against the fixture locating surface 32 and the work is shifted endwise against the stops 56. When the pressure of the fluid in the supply line 176 has built up to a predetermined value, a combined pressure relief and check valve 177 opens to admit fluid to another line 178 connected to the head ends of the sidewise locator-clamps 35 thereby advancing the latter to shift the work sidewise against the stops 72 on the fixture and clamp the inner edge of the work against the locating surface 32. The sequencing valve 177 is of the type which opens to pass pressure fluid in one direction at a different value than in the opposite direction, the valve requiring a higher pressure to pass fluid in a direction for advance of the sidewise locator-clamps than for retraction of these parts.

When the locator-clamps 35 are advanced and the pressure in the line 178 to their actuators reaches a predetermined value, a similar sequencing valve 179 opens to admit the fluid to lines 180 connected to the clamp actuators 77 to advance the clamps 33. The fluid pressure in the lines 180 then builds up and a pressure relief and check valve 181 opens to pass the fluid through lines 182 to the head ends of the plunger actuators 54 for advance of the plungers 51. The pressure in the lines 182 is detected by the switch PR which is closed when the pressure reaches a predetermined value, the closure of this switch and those closed in response to advance of all of the locating and clamping elements resulting in energization of the clamped relay 1CE to indicate that the work then is properly positioned and clamped in the fixture.

By virtue of its movement in unison with the fixture 31 passing through the loading station A, the platform 36 continues to support the workpiece W while the various locating and clamping operations are progressing in sequence. After traveling with the fixture for a time sufficiently long to insure completion of this sequence, a dog 183 (Fig. 20) rigid with the carriage 97 actuates a switch LS20 (Figs. 13 and 20) on the pedestal 40 for opening contacts LS20–1 thereof in series with the platform raise relay LPR to deenergize the latter and for closing contacts LS20–2 to complete a circuit to the lower relay LPL through normally closed contacts LPR–3 of the raise relay. The lower relay LPL includes normally open holding contacts LPL–1 in series with the dog switch contacts LS19–2 and normally closed contacts 169–2 of the table responsive relay 169, normally open contacts LPL–2 for completing a circuit to the lower solenoid 184 of the valve 154 for the platform actuator 103, and normally closed contacts LPL–3 and LPL–4 located respectively in series with the load relay LD to deenergize the same and in series with the raise relay LPR to insure deenergization of this relay upon energization of the lower relay LPL.

With the lowering solenoid 184 energized, pressure fluid is admitted to the upper end of the actuator 103 to initiate lowering of the platform and disengagement of the locking elements 116 and 117 at a time indicated by a line 185 in Fig. 13. A short time later as indicated by a line 186, the locking lug 116 should be free of the recess 119 so that the carriage stops its forward motion along the ways 109, the platform continuing to descend. When the platform reaches its lower starting position, a switch LS18 on the carriage 97 is closed by a dog 187 on the lower end of a rod 188 (Fig. 10) secured at its upper end to the platform and guided for vertical movement on the carriage. Closure of this switch completes an energizing circuit to a relay LPB for energizing the solenoid 189 of the valve 155 and admitting pressure fluid to the actuator 112 to return the carriage along the ways 109 to its starting position.

When the carriage 97 leaves its forward position, the dog 183 leaves the actuator for the switch LS20 and contacts LS20–2 thereof open to deenergize the lower relay LPL, the contacts LS20–1 closing in series with the raise relay LPR. In the retracted position of the carriage, the dog 173 thereon actuates the switch LS19 to open its contacts LS19–2 in the holding circuit of the lower relay LPL for deenergizing this relay and to close contacts LS19–1 in the conditioning circuit of the raise relay LPR. The parts of the actuators and circuits for the loading platform and the carriage thus are returned to their initial positions ready for another loading cycle.

In the event that the loading platform 36 fails to become unlocked from the fixture 31 in response to actuation of the switch LS20 by the dog 183, damage to the machine is avoided by safety mechanism which operates to stop the table 28 in response to forward movement of the carriage 97 beyond its normal range. This mechanism includes a mechanical circuit breaker 190 (Fig. 23b) in series with the contacts 165–1 of the relay 165 in the energizing circuit for the table motor 44 and an actuator 191 (Figs. 11, 13, and 20) in the form of a bell crank having one end connected to the movable breaker elements by a rod 192 and its other end positioned in the path of a dog 193 on the carriage (Fig. 20). When the latter overtravels to a position indicated by a line 194 in Fig. 13, the dog 193 shifts the bell crank to open the motor circuit thereby stopping the table.

*Unloading*

Assuming that the locking elements 116 and 117 are properly disengaged, the table 28 continues to rotate and the fixture 31 which was just loaded progresses along its path with the table to carry the workpiece successively through the milling stations B, C, and D and to the unloading station E. As the fixture approaches this station, the positions of its various positioning, locating and clamping elements are checked and the unloading mechanism is operated only if the fixture contains a properly located and clamped workpiece. For this purpose, normally open contacts 1CE–1 of the clamped relay 1CE are connected in parallel with a checking switch 1LS13 mounted on the housing frame 122 for movement with the table and actuation by a dog 195 (Figs. 14 and 15) on the pedestal post 39 as the fixture approaches the unloading station E. This parallel combination of switches is connected in an energizing circuit of a conditioning relay 2UP in series with similar combinations of corresponding switches 2LS13, 3LS13, 4LS13, 5LS13, and 6LS13 and contacts 2CE–1, 3CE–1, 4CE–1, 5CE–1, and 6CE–1 individual to each of the other fixtures. Thus, if the relay CE of any fixture approaching the unloading station E is deenergized due to retraction of any of the locating and clamping elements of the fixture, the circuit to the relay 2UP is opened when the switch LS13 individual to the fixture is opened by the dog 195. Other normally open contacts 1CE–2 of the relay 1CE are connected in a holding circuit around the pressure switch contacts PR–1 individual to each fixture.

Normally open contacts 2UP–1 of the conditioning relay 2UP are connected in a conditioning circuit for a raise relay 2UPR (Fig. 23b) operable when energized to complete its holding circuit at contacts 2UPR–1 and to complete a circuit at contacts 2UPR–2 for energizing a solenoid 196 of the valve 158 (Fig. 22) and admitting pressure fluid to the lower end of the platform actuator 103a to raise the unloading platform 37. The raise relay circuit is completed by closure of normally open contacts 197–1 of a relay 197 which is energized when the associated dog 123 (Fig. 14) moving with and individual to the fixture approaching the station closes the switch LS15 on the pedestal post 39, the checking dog 195 holding the checking switch LS13 open during the full time that the dog 123 closes the switch LS15 so that the energizing circuit for the raise relay 2UPR remains open and thus is disabled unless the workpiece in the fixture is properly located and clamped. The locations of the raise dog 123 and switch LS15 are correlated with the speeds of the table 28 and the unloading platform 37 to project the lug 116a on the platform into the recess 119a of the fixture locking element 117a to lock the platform to the fixture as an incident to raising of the platform in the same manner as the loading platform 36 becomes locked to the fixture.

If the workpiece W in the fixture approaching the unloading station E is properly located and clamped, the raise relay 2UPR is energized in response to closure of the switch LS15 by the dog 123 to raise the unloading platform 37. As the latter shifts out of its lower idle position, a dog 187a on the lower end of a rod 188a (Fig. 22) rigid with the platform moves out of contact with the actuator of a switch 2LS1 (Fig. 23b) on the carriage 97a to open the switch and deenergize a relay 198 having normally open contacts 198–1 in the energizing circuit of a start-turnover relay 2HR. When the unloading platform 37 reaches its upper position in which it is locked to the fixture and abuts the underside 25 of the workpiece W in the fixture, a dog 199 (Fig. 22) on the rod 188a closes a switch 2LS2 (Fig. 23a) to complete an energizing circuit to an unclamp relay 1HU of the fixture through normally open contacts 1LS13–1 which are closed when the checking dog 195 actuates the checking switch 1LS13. A circuit through the unclamp solenoid 200 of the direction valve 157 thus is energized for the admission of pressure fluid to the actuators 62, 69, 77 and 54 on the fixture thereby retracting the various locating and clamping elements 34, 35, 33, and 51 and releasing the workpiece to leave the same resting on the platform. As an incident to such retraction, the switches responsive thereto on the fixture being unloaded are shifted to energize the relay 1CR of the fixture and deenergize the relay 1CE.

During such unclamping, the lug 116a on the unloading platform 37 is in the recess 119 on the fixture 31 for movement of the platform and its carriage 97a in unison with the fixture along the fixture path to insure deposit of the workpiece in the desired position on the platform. At the start of such movement, a dog 201 on the carriage (Fig. 22) moves away from the actuator of a switch 2LS3 (Fig. 23b) to open contacts 2LS3–1 thereof in series with the contacts 197–1 in the conditioning circuit of the raise relay 2UPR and to close contacts 2LS3–2 in a holding circuit of a platform lower relay 2UPL. When the carriage reaches an advanced position after sufficient limited movement with the fixture to allow time for release of the workpiece onto the platform, a dog 202 on the carriage actuates a switch 2LS4 to open contacts 2LS4–1 thereof in the holding circuit of the raise relay 2UPR and to close contacts 2LS4–2 to complete the energizing circuit for the lower relay 2UPL through normally closed contacts 2UPR–3 of the raise relay 2UPR. A solenoid 203 of the valve 158 thus is energized by closure of contacts 2UPL–1 for admission of pressure fluid to the upper end of the platform actuator 103a to lower the unloading platform. As the platform starts its descent, the switch 2LS2 is opened in the circuit of the unclamp relay 1HU.

Should the unloading platform 37 overtravel due to its failure to descend and become unlocked from the fixture 31, a dog 204 on the carriage 97a (Fig. 22) shifts one leg of a bell crank 205 fulcrumed on the pedestal 40. The other leg of the crank is connected by a rod 206 to a mechanical circuit breaker 207 (Fig. 23b) to open the circuit to the table motor 44 and stop the table 28 in the same manner as overtravel of the loading fixture carriage 97.

*Turnover and Transfer*

By virtue of the location of the unloader arms 125 straddling the path of the unloading platform 37, the workpiece W on the latter is transferred to the arms automatically as an incident to lowering of the platform away from the fixture 31. When the platform reaches its lower position in which the workpiece rests on the unloader arms with the carriage 97a advanced so that these arms are alined with the receiver arms 134, the switch 2LS1 is closed by the dog 187a on the fixture for energization of the relay 198 and closure of its contacts 198–1 in the circuit of the start-turnover relay 2HR and other contacts 198–2 in the circuit of a carriage return relay 2UPB. The start-turnover relay circuit also includes in series the contacts 2LS4–2 which are closed when the carriage is advanced, normally closed contacts 208–1 of a relay 208 which is deenergized when a switch 2LS5 (Figs. 19 and 22) on the unloader arms 125 is opened upon shifting of its actuator by a workpiece on the arms, normally closed contacts 2LS10–1 of a switch 2LS10 (Fig. 16) whose actuator is displaced by a workpiece on the receiver arms 134, normally closed contacts 2LS7–1 of a switch 2LS7 whose actuator is displaced when the unloader arms are in their upper positions, and normally closed contacts 2HL–1 of a complete-turnover relay 2HL. In this same circuit, the contacts 208–1 which are closed when a workpiece is on the unloader arms 125 are paralleled by normally closed contacts 209–1 of a relay 209 which is deenergized when the receiver arms 134 are down to actuate a switch 2LS8 (Figs. 16, 22, and 23b) and open the latter. Also the contacts 2LS7–1 which are opened when the unloader arms are raised are paralleled by normally closed contacts 2LS9–1 of a switch 2LS9 (Figs. 16 and 22) whose actuator is displaced when the receiver arms 134 are raised.

It will be seen that the start-turnover relay 2HR will be energized when the unloading carriage 97a is advanced to close the contacts 2LS4–2, the unloading platform 37 is down for closure of the contacts 198–1, work is on the platform for closure of the contacts 208–1, the receiver arms are empty for closure of the contacts 2LS10–1, the unloader arms 125 are down for closure of the contacts 2LS1–1, and the complete-turnover relay 2HL is deenergized for closure of its contacts 2HL–1. Upon energization of the start-turnover relay 2HR by closure of contacts 198–1 when the platform is lowered a solenoid 210 of the valve 160 is energized for the admission of pressure fluid to a line 211 and the lower end of the receiver actuator 137 to raise the receiver arms 134. When the latter reach their upper position as shown in phantom in Fig. 22, pressure in the line 211 builds up to open a sequencing pressure by-pass and checking valve 212 to admit pressure fluid to the unloader actuator 132 to raise the unloader arms 125 to their upper positions shown in phantom in Fig. 22 and deposit the workpiece on the receiver arms. As an incident to these operations, the circuit for the start-turnover relay 2HR is interrupted by opening of the contacts 2LS7–1, 2LS9–1, and 2LS10–1, the actuators of the switches 2LS7 and 2LS9 being displaced by the two sets of arms in their upper positions to close series connected contacts 2LS7–2 and 2LS9–2 thereof and complete the energizing circuit of the complete-turnover relay 2HL through normally closed contacts 2HR–1 of the start-turnover relay 2HR and the now closed contacts 209–1, 198–1, and 2LS4–2.

Upon energization of the complete-turnover relay 2HL, contacts 2HL–3 thereof close to complete a holding circuit around the arm responsive contacts 2LS7–2 and 2LS9–2 and contacts 2HL–2 close for energization of a solenoid 213 of the valve 160 to change the fluid connections to the arm actuators 137 and 132. The receiver arms then descend and, after the arms reach their lower position and the pressure of fluid in a line 214 builds up, a sequencing pressure by-pass and checking valve 215 admits fluid to a line 216 for the unloader actuator 132 to return the unloader arms 125 to their lower positions, the switches 2LS9 and 2LS7 returning to their original conditions as the respective receiver and unloader arms leave their upper positions.

Return of the receiver arms 134 to their lower positions results in closure of the switch 2LS8 to energize the relay 209 and close contacts 209–2 thereof which complete the circuit to the carriage return relay 2UPB through the then closed contacts 198–2 and 208–2. This results in energization of the solenoid 217 of the valve 159 for admitting pressure fluid to the rod end of the carriage actuator 112a and thereby return the carriage to its starting position, such return occurring at the same time the unloader arms are being lowered. As the carriage leaves its advanced position, the switch 2LS4 returns to its initial condition in which contacts 2LS4–1 are closed in the circuit of the platform raise relay 2UPR and contacts 2LS4–2 open in the circuit to the platform lower relay 2UPL.

Closure of the switch 2LS8 by return of the receiver arms 134 to their lower positions also completes a circuit to a relay 218 through then closed contacts 2LS10–2 of the switch 2LS10 whose actuator is displaced by a workpiece on the receiver arms. This relay 218 operates to complete circuits (not shown) controlling the admission of pressure fluid to the actuators 145 and 148 in the proper sequence for transferring each workpiece off of the receiver arms and along the rails 141 into the loading station A' of the second tool 29', such sequence being controlled by switches LS11', LS12', LS13', LS14', which are actuated in response to longitudinal and angular shifting of the transfer fingers 142. When the workpiece is shifted off of the receiver arms 134 by the fingers, the contacts 2LS10–1 of the switch 2LS10 close in the circuit of the start-turnover relay 2HR and the contacts 2LS10–2 open in the circuit of the start transfer relay 218 thereby conditioning the circuits for the next cycle.

*Summary of operation*

The operation may be summarized in connection with a time chart (Fig. 24) which shows the sequence of the loading, unloading, and checking operations for the six fixtures 31 as the table 28 rotates through one revolution from a zero position in which one fixture, designated on the chart as the number one fixture, is passing through the loading station A, the other fixtures being numbered consecutively in a counterclockwise direction around the table from this fixture. In the zero position of the table, the loading platform 36 has already been raised as indicated along a line 219 and has become locked to the number one fixture so that, as the table rotates in a clockwise direction as viewed in Fig. 2 from the zero position, the platform and its carriage 97 advance in unison with the fixture as indicated by a line 220 (Fig. 24). During this travel, the various locating and clamping elements on the number one fixture are advanced to transfer the workpiece W to the fixture from the loading platform after which the latter descends as indicated along a line 221 corresponding to the line 185 of Fig. 13. Then, the loading platform and carriage return as indicated by a line 222 to their starting positions.

As the number one fixture 31 advances out of the loading station A and after approximately fifteen degrees of table rotation, the number three fixture is approaching the unloading station E and the checking switch 3LS13 individual to this fixture is opened by the dog 195 common to all of the fixtures. This switch is held open as indicated along a line 223 through the period of closure of the unloading platform raise switch LS15 by the dog 123 individual to the fixture as indicated by a line 224 thereby checking the fixture for raising the unloading platform 37 only if a workpiece is properly located and clamped in the third fixture. If such is the case, the unloading platform is raised as indicated by a line 225 and locked to the third fixture for movement therewith along the fixture path as indicated by a line 226. After the locating and clamping elements have been retracted during this platform movement to transfer the workpiece to the platform, the latter descends as indicated by a line 227 to deliver the work automatically to the unloader arms 125. The unloading carriage 97a then remains in its advanced position long enough for turnover of the work and transfer of the same to the transfer rails 141 after which the carriage and the platform are returned to their idle positions as indicated by a line 228.

Once the unloading operation on the third fixture is completed after approximately fifty degrees of table rotation from the zero position, the number two fixture enters the loading station A and the checking switch 2LS12 individual to the fixture is opened by the dog 170 common to all of the fixtures and is held open thereby as indicated by a line 229 through the period of closure of the common raise switch LS14 by the dog 121 individual to the fixture as indicated by a line 230. If the second fixture is empty with the locating and clamping elements thereof properly retracted, the loading platform 36 is raised as indicated by a line 231 for interlocking with the fixture and movement therewith along the fixture path as indicated at 232, the table having rotated through approximately sixty degrees by this time with the second fixture occupying the position of the first fixture in the zero position of the table. Upon continued rotation of the table, the sequence of operations continues with the fourth fixture next passing through the unloading station, the third fixture then passing through the loading station, the fifth fixture next entering the unloading station and so on until the table completes one revolution with the first fixture back in the loading station.

*Checking fixtures simultaneously*

To avoid damage to the machine parts resulting from a malfunction such as a workpiece W improperly located and clamped in one of the fixtures 31, novel means is provided to check all of the fixtures simultaneously as each fixture passes through a given checking area in the fixture path and to disable the driven mechanism for the table 28 in response to the detection of a malfunction in any one of the fixtures. This checking means comprises the various switches on each fixture for sensing the positions of the locating and clamping elements of the fixture, the sensing relays CR and CE whose respective energizations constitute signals that the elements of each fixture either all are retracted to indicate an empty fixture or all are advanced in engagement with a properly located and clamped workpiece, a disabling device CK which is operable when actuated to stop the table 28 by deenergizing the drive motor 44, and a checking circuit for controlling the disabling device and therefore the drive motor in response to the sensing relays of all the fixtures and actuating the device when both of the relays of any one fixture are deenergized so that no signal is present for that fixture. In this instance, the disabling device CK is a relay having normally open contacts CK–1 connected in series with the motor relay 165 so that, when the disabling relay is actuated by interruption of its energizing circuit, the circuit for the relay 165 is interrupted permitting the relay contacts 165–1 to open in the motor circuit.

The checking circuit constitutes the energizing circuit for the disabling relay CK and includes a normally closed switch LS16 (Figs. 14 and 15) which is mounted on the housing frame 122 and is opened by a dog 233 individual to each fixture as the latter passes through the checking area. Connected in parallel with the checking switch LS16 is a series arrangement of parallel combinations individual to the respective fixtures of normally open contacts CR–2 of the fixture empty relay CR and normally open contacts CE–3 of the elements-advanced relay CE of each fixture (see Fig. 23b). When either one of these relays for each fixture is energized and the checking switch LS16 is open, the disabling relay CK will remain energized through the sensing relay contacts. However, if both sensing relays of any one fixture are deenergized when the checking switch is opened, the disabling relay will be deenergized to open its contacts CK–1 in the circuit for the breaker 165 thereby interrupting the circuit for the table drive motor 44.

To check the fixtures after each loading and unloading operation, it is preferred to locate the switch LS16 for actuation by the respective dogs 233 as the associated fixtures individually pass through one checking area between the loading and first cutter stations A and B. Also, all of the fixtures are checked as each fixture is passing through a second checking area between the unloading and loading stations E and A, this check being made by a normally closed second switch LS17 connected in series with the first switch LS16 and mounted on the housing frame 122 to be opened by dogs 234 (Figs. 14 and 15) mounted on the pedestal post 39, the second switch operating the same as the first switch to open the energizing circuit for the relay CK if both relays CE and CR of any fixture are deenergized when the second switch is opened by one of the dogs 234.

Referring to the time chart of Fig. 24, the period during which the checking switch LS16 is held open during movement of the number one fixture 31 is between the loading and first cutter stations A and B as indicated by a line 235 and falls between the time when the loading carriage has returned as indicated at 222 and the time of opening of the switch 3LS13 as indicated at 223 to check for a full fixture entering the unloading station. The second switch LS17 is opened as indicated by a line 236 during return of the unloading carriage 97a as indicated at 228 and while the number three fixture just unloaded is leaving the unloading station E. Such checking occurs in a similar sequence as the other fixtures leave the loading and unloading stations in succession.

The operation of the second machine tool 29′ is similar to that of the first tool 29 after a workpiece has been loaded on the loading platform 36 by the transfer mechanism 38. Such operation includes checking of each fixture before loading and unloading of the same at the stations A′ and E′ and also the simultaneous checks of all of the fixtures after each loading and unloading operation. The simultaneous checks are made by apparatus (not shown) similar to that of the first tool described above for deenergizing the common table drive motor 44 in response to the detection of a malfunction at any one of the fixtures of the second tool.

I claim as my invention:

1. In a machine tool, the combination of, a fixture member, means for supporting and advancing said fixture member along a predetermined path and through a work transfer station, said fixture member having a pocket opening in a transverse direction away from said path to receive a workpiece, a work support member mounted at said station to move first in a direction to project a workpiece into the pocket, then along a part of the path with said fixture member, and finally away from the path and the fixture member, locking elements movable with the respective members and operable when engaged to lock the members together for movement in unison along said part of said path, said elements comprising a projection on one of said members and a recess on the other member interfitting with and disengaging each other respectively as an incident to shifting of said support member toward and away from said path, guide surfaces on said elements engaging each other as an incident to shifting of said support member toward said path and acting on the support member to shift the same along said path relative to said fixture member to facilitate entry of said projection into said recess, power actuated mechanism for shifting said support member toward and along said path, and means for actuating said mechanism in timed relation to passage of said fixture member through said station to bring said elements into locking engagement for movement of said members in unison along said part of said path.

2. In a machine tool, the combination of, a fixture member, means for supporting and advancing said fixture member along a predetermined path and through a work transfer station, said fixture member having a pocket opening in a transverse direction away from said path to receive a workpiece, a work support member mounted at said station to move first toward said path and to a position adjacent said pocket to project a workpiece into the pocket, then along a part of the path with said fixture member, and finally away from the path and the fixture member, locking elements movable with the respective members and operable when engaged to lock the members together for movement in unison along said part of said path, said elements comprising a projection on one of said members and a recess on the other member interfitting with and disengaging each other respectively as an incident to shifting of said support member toward and away from said path, power actuated mechanism for shifting said support member toward and along said path, and means for actuating said mechanism in timed relation to passage of said fixture member through said station to bring said elements into locking engagement for movement of said members in unison along said part of said path.

3. In a metal removing machine, the combination of a table mounted to turn continuously about an upright axis, a work receiving fixture mounted on the underside of said table for movement therewith successively through loading, working and unloading stations angularly spaced around the table, said fixture opening downwardly near the periphery of said table and having downwardly facing work locating surfaces and locating elements and clamps movable relative to said surfaces and engageable with a workpiece to secure the workpiece to and release the same from said surfaces, a horizontal loading platform for receiving and supporting the workpiece with the upper surface thereof exposed, means at said loading station supporting said platform below said table for vertical movement toward and away from the latter to dispose the supported workpiece in said fixture and for limited movement circumferentially with the table, a member movable with said platform to couple the platform positively to said fixture for arcuate travel in unison therewith, mechanism operated in timed relation to the turning of said table to actuate said platform, said locating elements, and said clamps to present a workpiece on said platform against said locating surfaces in the passing fixture, locate and clamp the workpiece, and finally uncouple the platform from the fixture whereby to leave the under surface of the workpiece exposed, a metal removing tool at said working station supported beneath said table for engagement with said under surface during the passage of the workpiece, an unloading platform similar to said loading platform similarly mounted at said unloading station and having a member movable therewith for coupling the platform positively to said fixture, and mechanism operated in timed relation to the turning of said table to activate said unloading platform for coupling the same to said fixture, release said clamps for transfer of a workpiece from said fixture to said platform and uncouple said platform from said fixture.

4. In a machine tool, the combination of, a fixture, means for supporting said fixture and moving the same continuously and unidirectionally through successive loading, work, and unloading stations spaced apart along a predetermined path, clamping members on said fixture operable when activated and deactivated respectively to secure a workpiece to and release the same from the fixture, loading and unloading platforms at the respective loading and unloading stations movable back and forth transversely of said path and longitudinally thereof with said fixture, a locking element movable with said fixture, locking elements, one on each of said platforms interengageable with said fixture element for movement of the platform along said path with the fixture in response to interengagement of the element on the fixture and the element on the platform after transverse movement of the platform toward the path and the fixture, power actuators for said clamping members and each of said platforms, and mechanism for energizing said actuators during advance of the fixture through the respective stations to shift each of said platforms toward said path for interengagement of said fixture element by said element on the platform and movement of the platform with the fixture through the station, activate said clamping members at said loading station and deactivate said members at said unloading station during movement of the associated platform along said path with the fixture at each station, and shift the respective platforms away from said path respectively after clamping of a workpiece by the members at the loading station and release of the workpiece at the unloading station.

5. In a metal removing machine, the combination of a table mounted to turn continuously about an upright axis, a work receiving fixture mounted on the underside of said table and opening downwardly near the periphery thereof, said fixture having downwardly facing work locating surfaces and locating elements and clamps movable relative to said surfaces and engageable with a workpiece contacting said surfaces to secure the workpiece to and release the same from said surfaces, a horizontal loading platform for receiving and supporting the workpiece with the upper surface thereof exposed, means supporting said platform below said table for vertical movement toward and away from the latter to dispose the supported workpiece in said fixture and for limited movement circumferentially with the table, a member movable with said platform to couple the platform positively to the table for arcuate travel in unison therewith, mechanism operated in timed relation to the turning of said table to actuate said platform, said locating elements, and said clamps to secure a workpiece from said platform against said locating surfaces in the passing fixture, and finally uncouple the platform from the table whereby to leave the under surface of the workpiece exposed, and a metal removing tool angularly spaced around said axis from said platform and engageable with said exposed under surface during the passage of the workpiece.

6. In a metal removing machine, the combination of a table mounted to turn continuously about an upright axis, a work receiving fixture mounted on the underside of said table and opening downwardly near the periphery thereof, said fixture having downwardly facing work locating surfaces and locating elements and clamps movable relative to and engageable with a workpiece contacting said surfaces to secure the workpiece to and release the same from said surfaces, a horizontal loading platform for receiving and supporting the workpiece with the upper surface thereof exposed, means supporting said platform below said table for vertical movement toward the table to dispose the supported workpiece in said fixture and for limited movement circumferentially with the table, a member movable with said platform to couple the platform positively to said fixture for arcuate travel in unison therewith, and mechanism operated in timed relation to the turning of said table to actuate said platform, said locating elements, and said clamps to secure a workpiece from said platform against said locating surfaces in the passing fixture, and finally uncouple the platform from the table whereby to leave the under surface of the workpiece exposed.

7. In a metal removing machine, the combination of a work support mounted to move continuously along a horizontally disposed path, a work receiving fixture mounted on the underside of said support and opening downwardly therefrom, said fixture having downwardly facing work locating surfaces and locating elements and clamps movable relative to and engageable with a workpiece to secure the workpiece to and release the same from said surfaces, a horizontal loading platform for receiving and supporting the workpiece with the upper surface thereof exposed, means supporting said platform below said support for vertical movement toward the support to dispose the supported workpiece in said fixture and for limited movement along said path with the support, a member movable with said platform to couple the platform positively to the fixture for horizontal travel in unison therewith, and mechanism operated in timed relation to advance of said support to actuate said platform, said locating elements, and said clamps to secure a workpiece from said platform against said locating surfaces in the passing fixture, and finally uncouple the platform from the support whereby to leave the under surface of the workpiece exposed.

8. In a metal removing machine, the combination of a work support mounted to move continuously along a predetermined path, a work receiving fixture mounted on said support and opening away from the same and in a direction extending transversely of said path, said fixture having work locating surfaces facing in said transverse direction and movable locating elements and clamps engageable with a located workpiece to secure the piece to and release the same from said surfaces, a transfer device for receiving and supporting the workpiece with one surface thereof exposed and facing toward said locating surfaces, means supporting said transfer device adjacent said path for movement toward and away from the path to dispose the supported workpiece in said fixture and for limited movement along the path with said support, a member movable with said device to couple the same positively to said fixture for travel along said path in unison therewith, and mechanism operated in timed relation to the advance of said support along said path to actuate said device, said locating elements, and said clamps to secure a workpiece from the device against said locating surfaces in the passing fixture, and finally uncouple the device from the support whereby to leave another surface of the workpiece exposed and facing away from said locating surfaces.

9. In a machine tool, the combination of, a fixture adapted to receive a workpiece and having clamps thereon operable, when activated, to hold the workpiece in a predetermined position in the fixture, means for supporting said fixture and advancing the same continuously along a predetermined path and through a loading station, a support for holding and delivering a workpiece approximately into said fixture position while said fixture is moving through said station, means mounting said support at said station for movement toward and away from said path in a direction transverse to the path and for movement along the path, locking elements movable with said support and said fixture respectively and interengaging each other as an incident to movement of the support toward said path to lock the support and the fixture together for movement in unison along the path with the workpiece on the support located approximately in said fixture position, a power actuator for said support operated as an incident to movement of said fixture through said station to shift the support toward said path for interengagement of said elements and for delivery of a workpiece approximately into said fixture position, power operated means responsive to movement of said support toward said path and operable to activate said clamps while the support is moving with said fixture, and means for energizing said actuator to shift said support away from said path to disengage said elements after said clamps are activated.

10. In a machine tool, the combination of, a fixture adapted to receive a workpiece and having clamps thereon operable, when advanced, to hold the workpiece in a predetermined position in the fixture and, when retracted, to release the workpiece, means for supporting said fixture and advancing the same continuously along a predetermined path and through an unloading station, a support for receiving a workpiece from said fixture while said fixture is moving through said station and for supporting the workpiece in a predetermined position, means mounting said support at said station for movement toward and away from said path in a direction transverse to the path and for movement along the path, locking elements movable with said support and said fixture respectively and interengaging each other as an incident to movement of the support toward said path to lock the support and the fixture together for movement in unison along the path with the workpiece on the fixture located approximately in said support position, a power actuator for said support operated as an incident to movement of said fixture through said station to shift the support toward said path for interengagement of said elements and delivery of a workpiece into said support position, power operated means responsive to movement of said support toward said path and operable to retract said clamps to transfer the workpiece to the support while the latter is moving with said fixture, and means for energizing said actuator after retraction of said clamps to shift said support and the workpiece away from said path and thereby automatically disengage said elements.

11. In a metal removing machine, the combination of, a fixture, means for supporting said fixture and advancing the same continuously along a predetermined path and in a horizontal direction through a loading station, means on said fixture defining a work receiving pocket which opens downwardly when the fixture is passing through said station and including clamping members operable when advanced to hold the workpiece in a predetermined position in the fixture and when retracted to release the workpiece, a platform normally disposed beneath said path and mounted at said station separately from said fixture for movement toward and away from the path and for movement along said path in said horizontal direction, means for shifting said platform in synchronism with movements of said fixture and operable to shift the platform first upwardly toward said path and the fixture and into engagement with the underside of a workpiece in said fixture position, then in said horizontal direction in unison with the fixture to maintain such engagement with the workpiece, and finally downwardly away from the path and the fixture, and power actuated means operating in timed relation to shifting of said platform to retract said clamping members while the platform and the workpiece are moving in unison with said fixture whereby the workpiece is released from the fixture and delivered by gravity into a predetermined position on the platform.

12. In a metal removing machine, the combination of, a fixture, means for supporting said fixture and advancing the same continuously along a predetermined path and in a horizontal direction through a loading station, means on said fixture defining a work receiving pocket which opens downwardly when the fixture is traveling through said station and including clamping members operable when actuated to hold the workpiece in a predetermined position in the fixture, a platform normally disposed in an idle position beneath said path and supported at said station for movement toward and away from the path to deliver a workpiece into said fixture and also for movement back and forth in opposite directions along said path, means for shifting said platform in synchronism with movement of said fixture and operable to shift the platform first upwardly toward said path and the fixture to project a workpiece on the platform into said pocket and approximately into said predetermined position, then in said horizontal direction in unison with the fixture to maintain the approximate location of the workpiece in said position, then downwardly away from the path and out of the fixture, and finally reversely along said path back to said idle position, and power actuated means operating in timed relation to shifting of said platform to actuate said clamping members while the platform and the workpiece are moving in unison with said fixture whereby the workpiece is clamped and retained in said predetermined position as the platform is shifted away from said path.

13. In a machine for removing material from a workpiece, the combination of, a fixture having a work receiving opening facing away from a predetermined fixture path in a direction transverse to the latter to receive a workpiece and defined by means including clamping members for holding a workpiece in a predetermined position in the fixture, means for supporting said fixture and advancing the same continuously along said path and through an unloading station, a support adapted to receive a workpiece from said fixture through said opening during movement of the fixture through said station and supported at the latter to move from a normal idle position toward and away from said path and also back and forth in opposite directions along the path, means for shifting said support in synchronism with movement of said fixture and operable to shift the support from said idle position first toward the path and into engagement with a workpiece in said fixture position, then along the path in unison with the fixture to maintain such engagement, then away from the path, and finally reversely along the path back to said idle position, and power actuated means operating in timed relation to movement of said support to actuate said clamping members while the support and the workpiece are moving in unison with said fixture whereby the workpiece is released from the fixture for transfer to said support and movement with the latter away from said path.

14. In a machine for removing material from a workpiece, the combination of, a fixture having clamping members operable when actuated to hold a workpiece in a predetermined position in the fixture, means for supporting said fixture and advancing the same continuously along a predetermined path and through a loading station, a support for delivering a workpiece to said fixture while the latter is moving through said station, means mounting said support at said station for movement toward and away from said path and also in opposite directions along said path, means for shifting said support in synchronism with movement of said fixture through said station and operable to shift the support in said normal position first toward the path and the fixture to deliver a workpiece on the support approximately into said fixture position, then along said path in unison with said fixture to maintain the approximate location of the workpiece in said position, then out of the fixture and away from the path, and finally in the reverse direction along said path and back to said normal position and power actuated means for actuating said clamping members while said support and the workpiece are moving in unison with said fixture along said path whereby the workpiece is clamped to the fixture and retained therein as the support is shifted away from the path.

15. In a continuous machine for removing material from a workpiece, the combination of, a fixture having clamping members movable thereon between advanced positions of holding engagement with a workpiece in a predetermined position in the fixture and released positions in which workpieces may be moved into and out of the fixture, means for supporting said fixture and advancing the same continuously along a predetermined path and through an unloading station, a support for receiving a workpiece from said fixture while the latter is moving through said station, means mounting said support at said station for movement toward and away from said path and also along the path with said fixture, means for shifting said support in synchronism with movement of said fixture through said station and operable to shift the support first toward the path and the fixture to a position of engagement with a workpiece in said fixture position, then along said path in unison with said fixture to maintain such engagement and finally away from the path, and power actuated means for shifting said clamping members to said released positions thereof while said support and the workpiece are moving in unison with said fixture along said path whereby the workpiece is released from the fixture and transferred to a predetermined position on the support for movement therewith from the path.

16. In a machine tool having a continuously movable support with a work receiving fixture mounted on and movable horizontally with the support through an unloading station and adapted to support a workpiece with the underside thereof exposed, work unloading mechanism having, in combination, a carriage mounted at said station beneath said support for limited movement back and forth between end positions along the path of said fixture, a platform having an upwardly facing work supporting surface and mounted on said carriage for vertical movement of such surface toward said support to engage said exposed underside of a workpiece in said fixture and away from the support to carry the workpiece out of said fixture and to a lower position on the carriage, laterally spaced unloader arms mounted on said carriage for movement with the latter along said path and for turning of the arms together about a horizontally disposed axis and upwardly from horizontal receiving positions in which the arms straddle parts of said platform in said lower position thereof and underlie said underside of a workpiece on the platform to upper discharge positions, and a receiver mounted separately from said carriage adjacent one of said end positions thereof and adjacent said upper positions of said unloader arms to receive a workpiece from such arms after the latter have transferred the workpiece upwardly away from said platform.

17. In a machine tool having a continuously movable support with a work receiving fixture mounted on and movable horizontally with the support through an unloading station and adapted to support a workpiece with the underside thereof exposed, work unloading mechanism having, in combination, a carriage mounted at said station beneath said support for limited movement back and forth between end positions along the path of said fixture, a platform having an upwardly facing work supporting surface and mounted on said carriage for vertical movement of such surface toward said support to engage said exposed underside of a workpiece in said fixture and vertical movement of the surface away from the support to carry the workpiece out of said fixture and to a lower position on the carriage, an unloader having an upwardly facing work supporting surface thereon disposed adjacent said lower platform position and beneath a workpiece descending with the platform for delivery of the workpiece to the unloader surface automatically as an incident to lowering of the platform away from said support, means supporting said unloader to turn about a horizontally disposed axis and upwardly away from said platform to a discharge position to transfer the workpiece away from said platform, and mechanism for shifting said unloader in response to movement of said platform and operable to raise the unloader to said discharge position as an incident to shifting of the platform into said lower position.

18. In a machine tool having a continuously movable support with a work receiving fixture mounted on and movable horizontally with the support through an unloading station and adapted to support a workpiece with the underside thereof exposed, work unloading mechanism having, in combination, a carriage mounted at said station beneath said support for limited movement back and forth between end positions along the path of said fixture, a platform having an upwardly facing work supporting surface and mounted on said carriage for vertical movement of such surface toward said support to engage said exposed underside of a workpiece in said fixture and away from the support to carry the workpiece out of said fixture and to a lower position on the carriage, an unloader having an upwardly facing work supporting surface thereon disposed adjacent said lower platform position and beneath a workpiece descending with the platform for delivery of the workpiece to the unloader surface automatically as an incident to lowering of the platform away from said support, means supporting said unloader to turn about a horizontally disposed axis and upwardly away from said platform to a discharge position to transfer the workpiece away from said platform, and a receiver mounted adjacent said unloader discharge position to receive a workpiece from said unloader after the latter has transferred the workpiece away from said platform.

19. In a machine tool, the combination of a fixture having work locating and clamping elements relatively movable between spaced release positions to receive and discharge a workpiece and advanced positions of said elements in engagement with the workpiece to secure the latter in a predetermined position in the fixture, a traveling support mounting said fixture for movement along a predetermined path and through an unloading station, means for advancing said support and said fixture continuously along said path, an unloading device mounted at said station to move toward and away from said path, mechanism operable when actuated to move said device in synchronism with said fixture for transfer of a workpiece from said fixture to the device, means operable in timed relation to movement of said support to actuate said mechanism for effecting such transfer as said fixture is passing through the station, sensing means responsive to the movement of said fixture elements and operable to give a signal when all of the elements are in said advanced positions, and means controlling said mechanism in response to said signal of said sensing means and operating to condition the mechanism for shifting said loading device in synchronism with said fixture when the signal is present and to disable the mechanism when the signal is absent.

20. In a machine tool, the combination of a fixture having work locating and clamping elements relatively movable between spaced release positions to receive and discharge a workpiece and advanced positions of said elements engagement with the workpiece to secure the latter in a predetrmind position in the fixture, a traveling support mounting said fixture for movement along a predetermined path and through a loading station, means for advancing said support and said fixture continuously along said path, a loading device mounted at said station to move toward and away from said path, mechanism operable when actuated to move said device in synchronism with said fixture to deliver a workpiece on the device approximately into said predetermined fixture position, means operable in timed relation to movement of said support to actuate said mechanism for delivering a workpiece to said fixture as the latter is passing through the station, sensing means responsive to the movement of said fixture elements and operable to give a signal when all of the elements are in said released positions, and means controlling said mechanism in response to said signal of said sensing means and operating to condition the mechanism for shifting said loading device in synchronism with said fixture when the signal is present and to disable the mechanism when the signal is absent.

21. In a machine tool, the combination of a fixture adapted to receive and discharge a workpiece and having clamps for securing a workpiece in the fixture, a traveling support mounting said fixture for movement along a predetermined path and through a loading station, means for advancing said support and said fixture continuously along said path, a loading device mounted at said station to move toward and away from said path, mechanism operable when actuated to move said device in synchronism with said fixture to deliver a workpiece on the device approximately into said predetermined fixture position, means operable in timed relation to movement of said support to actuate said mechanism for delivering a workpiece to said fixture as the latter is passing through the station, sensing means for detecting the presence of a workpiece in said fixture and giving a signal when the fixture is empty, and means controlling said mechanism in response to said sensing means and operable to condition the mechanism for shifting said loading device when the signal is present and to disable the mechanism when the signal is absent.

22. In a machine tool, the combination of a fixture adapted to receive and discharge a workpiece and having clamps for securing a workpiece in the fixture, a traveling support mounting said fixture for movement along a predetermined path and through an unloading station, means for advancing said support and said fixture continuously along said path, an unloading device mounted at said station to move toward and away from said path, mechanism operable when actuated to move said device in synchronism with said fixture for transfer of a workpiece from said fixture to the device, means operable in timed relation to movement of said support to actuate said mechanism for effecting such transfer as the fixture is passing through the station, sensing means for detecting the presence of a workpiece in said fixture and giving a signal when a workpiece is in the fixture, and means controlling said mechanism in response to said sensing means and operable to condition the mechanism for shifting said loading device when the signal is present and to disable the mechanism when the signal is absent.

23. In a machine tool, the combination of, a traveling work support, a plurality of fixtures arranged in a series on said support and each adapted to receive a workpiece and clamp the same in a predetermined position in the fixture, drive mechanism for moving said support continuously to advance each of said fixtures along a predetermined path and successively through loading, work, and unloading stations, a device operable when actuated to disable said drive mechanism, means individual to each fixture for detecting and signaling the presence and proper location of a workpiece in the fixture, said detecting means for each of said fixtures including a pair of parallel switches one of which is closed when the fixture is empty and the other of which is closed when a workpiece is in the fixture in said predetermined position, a checking area disposed along said path between two of said stations and a checking circuit controlling said disabling device and including said parallel pair of switches of each fixture connected in series with the device and with the pairs of switches of the other fixtures, a normally closed checking switch connected in series with said device and across all of said series-connected parallel switches and opened as an incident to movement of said support each time one of said fixtures passes through said checking area whereby to deenergize the device and disable said drive mechanism when both of any one pair of parallel switches are open indicating an improperly located workpiece in the associated fixture.

24. In a machine tool, the combination of, a traveling work support, a plurality of fixtures arranged in a series on said support and each having locating and clamping elements relatively movable between spaced release positions to receive and discharge a workpiece and advanced positions of clamping engagement with a workpiece, drive mechanism for moving said support continuously to advance said fixtures along a predetermined path and successively through loading, work, and unloading stations, sensing means individual to each of said fixtures for detecting the presence and proper location of a workpiece in the fixture and operable to give one signal when the fixture is empty and said elements thereof are in said retracted positions and another signal when a workpiece is properly located and clamped in the fixture, a device operable when actuated to disable said drive mechanism for stopping advance of said support and said fixtures, a checking area disposed along said path, and means controlling said device in response to said signals of all of said sensing means and operable to check the condition of all of said fixtures simultaneously each time a fixture passes said checking area and to actuate said disabling device in the event that, during the checking, the sensing means of any one of the fixtures fails to give one of said signals whereby to stop said support when a workpiece is improperly positioned in any one of the fixtures.

25. In a machine tool, the combination of, a traveling work support, a plurality of fixtures arranged in a series on said support and each adapted to receive a workpiece and clamp the same in a predetermined position in the fixture, drive mechanism for moving said support continuously and advancing each of said fixtures along a predetermined path and successively through a loading station where a workpiece is delivered and clamped to the fixture, a work station where a metal removing operation is performed on the clamped workpiece, and an unloading station where the workpiece is discharged from the fixture, a device operable when actuated to disable said drive mechanism, means individual to each of said fixtures for detecting the presence of an improperly located and clamped workpiece in the fixture, two checking areas disposed along said path respectively between said loading and work stations and between said unloading and loading stations, and means controlling said disabling device in response to said detecting means of all of said fixtures and operable to check the latter simultaneously during continuous movement of said support and as each fixture is passing through each of said checking areas and to actuate the device to stop said support when a workpiece in any one of the fixtures is in any other than said predetermined position.

26. In a machine tool, the combination of, a traveling work support, a plurality of fixtures arranged in a series on said support and each adapted to receive a workpiece and clamp the same in a predetermined position in the fixture, drive mechanism for moving said support continuously and advancing each of said fixtures along a predetermined path and successively through loading, work, and unloading stations, a device operable when actuated to disable said drive mechanism, means individual to each of said fixtures for detecting the presence of an improperly located and clamped workpiece in the fixture, a checking area disposed along said path, and means controlling said disabling device in response to said detecting means of all of said fixtures and operable to check the latter simultaneously as each fixture is passing through said checking area and to actuate the device to stop said support when a workpiece in any one of the fixtures is in any other than said predetermined position.

27. In a machine for removing material from a workpiece, the combination of, a fixture adapted to receive and release workpieces, means for supporting said fixture and advancing the same continuously along a predetermined path and through a station, a carriage mounted at said station for limited movement back and forth along said path, a transfer device adapted to support a workpiece and mounted on said carriage for movement therewith along said path and for movement relative to the carriage and toward and away from the path, power actuated mechanism for shifting said transfer device relative to said carriage by movement toward and away from said path, coupling elements on said fixture and said transfer device engageable with each other as an incident to movement of the device toward the fixture to couple the device to the fixture for movement of the device and said carriage in unison with the fixture along said path, said coupling elements disengaging each other as an incident to movement of said device away from said path, means for actuating said mechanism in timed relation to advance of said fixture to shift said device toward said path to couple said elements as the fixture moves through said station and to shift the device away from the path as the fixture leaves the station and power actuated means for moving said carriage along said path reversely to the direction of movement of said fixture.

28. In a machine for removing material from a workpiece, the combination of, a fixture adapted to receive and release workpieces, means for supporting said fixture and advancing the same continuously along a predetermined path and through a station, a carriage mounted at said station for limited movement back and forth along said path, a transfer device adapted to support a workpiece and mounted on said carriage for movement therewith along said path and for movement relative to the carriage by movement toward and away from the path, power actuated mechanism for shifting said transfer device relative to said carriage and toward and away from said path, power actuated mechnism for shifting said carriage along said path in a direction opposite to the direction of movement of said fixture, and means for actuating said mechanisms first to shift said transfer device toward said path to a position adjacent said fixture, then to shift the device and the carriage along the path in unison with the fixture, next to shift the device away from said path and finally to shift the device and the carriage along the path in said opposite direction.

References Cited in the file of this patent

UNITED STATES PATENTS

| Number | Name | Date |
|---|---|---|
| 1,712,907 | Stenhouse | May 14, 1929 |
| 1,924,594 | Blood et al. | Aug. 29, 1933 |
| 1,943,107 | Candee | Jan. 9, 1934 |
| 2,142,735 | Rougemont | Jan. 3, 1939 |
| 2,160,476 | Kampmeier | May 30, 1939 |
| 2,251,948 | Oberhoffken et al. | Aug. 12, 1941 |
| 2,429,938 | Mansfield | Oct. 28, 1947 |
| 2,606,359 | Stadthaus | Aug. 12, 1952 |